United States Patent
Arikan et al.

(10) Patent No.: US 7,218,274 B2
(45) Date of Patent: May 15, 2007

(54) SYSTEM AND METHOD FOR DETECTION AND TRACKING OF TARGETS

(76) Inventors: Orhan Arikan, Bilkent University Housing No. 29/4, Bilkent, Ankara (TR) 06533; Ahmet Kemal Ozdemir, Guzelevler Sisli Sokak No. 22/7, Yenimahalle, Ankara (TR) 06170

( * ) Notice: Subject to any disclaimer, the term of this patent is extended or adjusted under 35 U.S.C. 154(b) by 0 days.

(21) Appl. No.: 10/691,245

(22) Filed: Oct. 21, 2003

(65) Prior Publication Data

US 2004/0085241 A1  May 6, 2004

Related U.S. Application Data

(63) Continuation of application No. 09/875,116, filed on Jun. 6, 2001, now Pat. No. 6,636,174.

(60) Provisional application No. 60/209,758, filed on Jun. 6, 2000.

(51) Int. Cl.
    *G01S 7/00* (2006.01)
    *G01S 13/00* (2006.01)
(52) U.S. Cl. .......................... 342/195; 342/89; 342/90; 342/99; 342/104; 342/109; 342/118; 342/128; 342/175; 342/196
(58) Field of Classification Search ................. 342/27, 342/28, 89–112, 115, 118, 127–137, 175, 342/189–197, 13–20; 367/87–95, 99–102; 708/4
See application file for complete search history.

(56) References Cited

U.S. PATENT DOCUMENTS

| | | |
|---|---|---|
| 3,827,629 A | 8/1974 | Max et al. |
| 4,339,176 A | 7/1982 | Lee |
| 4,389,092 A | 6/1983 | Tamura |
| 4,440,472 A | 4/1984 | Cohen |
| 4,462,032 A | 7/1984 | Martin |
| 4,468,093 A | 8/1984 | Brown |
| 4,531,195 A | 7/1985 | Lee |
| 5,416,488 A | 5/1995 | Grover et al. ............. 342/159 |
| 5,555,532 A | 9/1996 | Sacha |
| 5,583,512 A | 12/1996 | McEligot |
| 6,636,174 B2 * | 10/2003 | Arikan et al. ................ 342/195 |

FOREIGN PATENT DOCUMENTS

JP       61212781 A  *  9/1986

OTHER PUBLICATIONS

IBM Tech. Discl. Bull. (vol. 28, No. 9; pp. 4023-4025); "Processing the Echo from Range-Dependent Multiplexed Pulses in Range-Doppler Radar"; Published Feb. 1, 1986; IBM Corp.; Armonck, NY.*

IBM Tech. Discl. Bull. (vol. 36, No. 1; pp. 226-227); "Computing the Aliased Ambiguity Surface"; Published Jan. 1, 1993; IBM Corp.; Armonck, NY.*

D. Lush, "Airborne Radar Analysis Using the Ambiguity Function"; Proceedings of the IEEE International Radar Conference; pp. 600-605; copyrighted in the year 1990. IEEE Pub. No. CH2882-9/90/0000-0600$1.0.*

(Continued)

*Primary Examiner*—Bernarr E. Gregory
(74) *Attorney, Agent, or Firm*—Jones Day

(57) ABSTRACT

System and method for detection and tracking of targets, which in a preferred embodiment is based on the use of fractional Fourier transformation of time-domain signals to compute projections of the auto and cross ambiguity functions along arbitrary line segments. The efficient computational algorithms of the preferred embodiment are used to detect the position and estimate the velocity of signals, such as those encountered by active or passive sensor systems. Various applications of the proposed algorithm in the analysis of time-frequency domain signals are also disclosed.

20 Claims, 32 Drawing Sheets

OTHER PUBLICATIONS

F. Hlawatsch et al., "The Ambiguity Function of a Linear Signal Space and its Application to Maximum-Likelihood Range/Doppler Estimation"; copyrighted in the year 1992; IEEE Pub. No. 0-7803-0805-0/92$3.00.*
A.V. Dandawate et al., "Differential delay-Doppler estimations using second and higher-order ambiguity functions," 140 IEEE Proceedings 410-18 (Dec. 1993).
M. Rendas et al., "Ambiguity in Radar and Sonar," 46 IEEE Transactions on Signal Processing 294-305 (Feb. 1998).
C.Y. Yin et al., "Performance Analysis of the Estimation of Time Delay and Doppler Stretch by Wideband Ambiguity Function," IEEE Publication 0-7803-4308-5/98$10.00 452-55 (1998).
A. Dogandzic et al., "Estimating Range, Velocity, and Direction with a Radar Array," IEEE Publication 0-7803-5041-3/99$10.00 2773-76 (1999).
W.K. Chung et al., "Pulse-Diverse Radar Waveform Design for Accurate Joint Estimation of Time Delay and Doppler Shift," Proceedings of the IEEE International Conference on Acoustics, Speech, and Signal Processing 3037-40 (2000).
A. Dogandzic et al., "Cramer-Rao Bounds for Estimating Range, Velocity, and Direction with a Sensor Array," IEEE Publication 0-7803-6339-6/00$10.00 370-74 (2000).
P. M. Woodward, Probability and Information Theory, with Application to Radar, McGraw-Hill Book Co., Inc., pp. 115-125, 1953.
V. Namias, "The fractional order Fourier transform and its application to quantum Mechanics", J. Inst. Math. Appl., vol. 25, pp. 241-265, 1980.
W. Lohmann and B. H. Soffer, "Relationships between the Radon-Wigner and fractional Fourier transforms", J. Opt. Soc. Am. A. vol. 11, pp. 1798-1801, 1994.
A. K. Özdemir and O. Arikan, "Fast computation of the ambiguity function and the Wigner distribution on arbitrary line segments", IEEE trans. Signal Process., vol. 49, No. 2, pp. 381-393, Feb. 2001.
A. K. Özdemir and O. Arikan, "Efficient computation of the ambiguity function and the Wigner distribution on arbitrary line segments", in Proc. IEEE Int. Symp. Circuits and Systems, vol. IV, pp. 171-174, May 1999.
I. Raveh and D. Mendlovic, "New properties of the Radon transform of the cross-Wigner/ambiguity distribution function", IEEE Trans. Signal Process., vol. 47, No. 7, pp. 2077-2080, Jul. 1999.
D. Mendlovic and H. M. Ozaktas, "Fractional Fourier transforms and their optical implementation: I" *J. Opt. Soc. Am. A*, vol. 10, pp. 1875-1881, 1993.
H. M. Ozaktas and D. Mendlovic, "Fractional Fourier transforms and their optical implementation: II", J. Opt. Soc. Am. A, vol. 10, No. 12, pp. 2522-2531, 1993.
H. M. Ozaktas, O. Arikan, M. A. Kutay and G. Bozdagi, "Digital computation of the fractional Fourier transform", IEEE Trans. Signal Process., vol. 44, No. 9, pp. 2141-2150, Sep. 1996.
L. B. Almedia, "The fractional Fourier transform and time-frequency Representations", *IEEE Trans. Signal Process.*, vol. 42, No. 11, pp. 3084-3091, Nov. 1994.
L. Cohen, "Time-frequency distributions—A review", Proc. IEEE, vol. 77, No. 7 pp. 941-981, Jul. 1989.
R. N. Bracewell, The Fourier Transform and its Applications, McGraw-Hill Book Company, pp. 356-381, 1978.
G. H. Golub and C. F. Van Loan, Matrix Computations, Baltimore: John Hopkins University Press, pp. 206-209, 222-227, 236-241, 248-253, 256-259, 1996.
P. W. East (ed.), Advanced ESM Technology, Microwave Exhibitions and Publishers Ltd., 1988.
V. G. Nebabin, Methods and Techniques of Radar Recognition, Artech House, Inc., pp. 106-125, 1995.
R. E. Blahut, W. Miller and Jr. C. H. Wilcox, Radar and Sonar—Part I, Springer-Verlag, vol. 32, pp. 1-5, 10-17, 26-29, 1991.
R. E. Kalman, "A new approach to linear filtering and prediction problems", J. Basic Engineering, Trans. ASME Series D, vol. 82, pp. 35-45, 1960.
Per-Olof Gutman and Mordekhai Velger, "Tracking Targets Using Adaptive Kalman Filtering", IEEE Trans. Aerospace and Electronic Systems, vol. 26, No. 5, pp. 691-699, Sep. 1990.
L. R. Rabiner, R. W. Schafer and C. M. Rader, "The Chirp z-Transform Algorithm", IEEE Trans. Audio and Electroacoustics, vol. AU-17, No. 2, pp. 86-92, Jun. 1969.
European Patent Office Communication, dated Mar. 2, 2006 with Supplementary European Search Report dated Feb. 22, 2006, App. No. 01942045.4 -2220 PCT/US0118408.
Ozdemir A. K., et al.: "Efficient Computation of the Ambiguity Function and the Wigner Distribution on Arbitrary Line Segments," Proceedings of the 1999 IEEE International Symposium on, Circuits and Systems, 1999. ISCAS '99, Jul. 1999, pp. 171-174 vol. 4, May 30, 1999-Jun. 2, 1999, Orlando, FL, USA Proceedings of the 1999 IEEE International Symposium in Orlando, FL, USA May 30-Jun. 2, 1999. Piscataway, NJ, USA, IEEE, US, vol. 4, May 30, 1999, pp. 171-174, XP010341157, ISBM: 0-7803-5471-0.
Ozaktas H. M., et al.: "Digital Computation of the Fractional Fourier Transform" IEEE Transactions on Signal Processing, IEEE Service Center, New York, NY, US, vol. 44, No. Sep. 9, 1996, pp. 2141-2150, XP000637522, ISSN: 1053-587X.
Lush D. C.: "Airborne Radar Analysis Using the Ambiguity Function," IEEE, May 7, 1990, pp. 600-605, XP010007427.

* cited by examiner

SYSTEM AND METHOD FOR DETECTION AND TRACKING OF TARGETS

This application is a continuation of U.S. patent application Ser. No. 09/875,116 filed Jun. 6, 2001, titled System and Methods for Detection and Tracking of Targets, now U.S. Pat. No. 6,636,174 which in turn claims priority of provisional application Ser. No. 60/209,758 filed Jun. 6, 2000, which is incorporated herein by referenced.

BACKGROUND OF THE INVENTION

Field of Invention

The present invention relates to active and passive sensor applications, and more particularly is directed to efficient systems and methods for detection and tracking of one ore more targets.

Detection and tracking of targets by sensor systems have been the subject matter of a large number of practical applications. Sensor systems designed for this purpose may use propagating wave signals, such as electromagnetic or acoustical signals. Some sensor systems, such as radar and active sonar systems, are designed to receive reflections of a transmitted signal generated by an appropriate conventional transmitter. This type of sensor systems will be referred to as active sensor systems. In contrast with the active sensor systems, in many cases sensor systems are designed to receive signals not generated by a cooperating transmitter. Such sensor systems will be referred to next as passive sensor systems.

Active sensor systems are generally used for detection of scattering objects that show great variation in size and type. In the presence of a scattering object, the transmitted signal arrives to the receiving sensor system with a certain time delay, which is related to the range of the scattering object (i.e., the distance to it). Also, if the scattering object is moving, the reflected signal exhibits a spectral shift that is known as a Doppler shift. The Doppler shift is related to the relative velocity of the object with respect to the sensor system. In order to provide an example of a received signal in an active sensor system, a stimulation has been conducted for a radar system that transmits a phase-coded radar signal as shown in FIG. 1A. In this stimulation, the transmitted signal reflects back from an object, at a 12 km range, which is moving with a velocity of 400 m/s towards the radar system. The reflected signal is received by the radar antenna and down-converted by a conventional analog receiver system, such as shown in FIG. 4. The output of the analog receiver system is shown in FIG. 1B, where the effects of the object range and velocity are seen as a delay and an additional frequency modulation of the received signal, respectively. These two prominent effects of the received signal can be more readily observable on the cross-ambiguity function of the transmitted and received signals, which is defined as:

$$A_{r,s}(\tau, v) = \int r(t+\tau/2) s^*(t-\tau/2) e^{j2\pi vt} dt \quad (1.1)$$

where s(t) is the transmitted signal and r(t) is the received signal. For the transmitted and received signal pair shown in FIGS. 1A and 1B, respectively, the magnitude of the cross-ambiguity function is illustrated in FIG. 1C as a 3-Dimensional plot. In FIG. 1D, the contour plot of the same cross-ambiguity function is provided. Since it is easier to visualize the structure, contour plots of the cross-ambiguity function are more commonly used in practice. As seen in FIG. 1D, the peak of the cross-ambiguity function is located at the corresponding delay the Doppler shift caused by the scattering object. This observed correspondence between the peak location of the cross-ambiguity function on one hand, and the position and the velocity of the scattering object on the other is a general relationship, which holds true in all cases where there is no or little noise at the receiver.

In the case of a noisy reception of the reflected signal, the peak location of the cross-ambiguity function still provides a reliable estimate of the delay and the Doppler shift caused by the scattering object [1]. Therefore, in accordance with the present invention it is possible to detect the presence of a scattering object by finding the peak locations of the cross-ambiguity function and comparing them with appropriately chosen threshold levels. Those peaks that exceed the thresholds can be identified as scattering objects, and the locations of the peaks will provide the corresponding delay and Doppler shift information at the same time.

Although the use of the cross-ambiguity function for detection of scattering objects and estimation of their corresponding delay and Doppler shifts is known in the prior art, this approach has only been used in sophisticated sensor systems because of the high cost and difficulty of implementation. Therefore, in most of the applications where the cost is a critical issue, the sensor systems are designed to detect the presence of scattering objects and estimate either their range or their velocities, but not both. The main objective of the present invention in relation to active sensor systems is to provide an efficient and low-cost system and method that can reliably detect scattering objects and estimate both their delay and their Doppler shifts at the same time.

Passive sensor systems are generally used for the interception of signals emitted by transmitters that are not in cooperation with the sensor system, i.e., operate independently of it. Unlike the active sensor systems where the range and the velocity of the objects can be estimated from the reflected signals, passive sensor systems cannot decide on the range and the velocity of the intercepted transmitter without extensive prior information about the transmitter. In passive reception, the main purpose is the detection of an existing transmitter. Once a transmitter is detected, its intercepted signal can be analyzed to obtain information about the type and purpose of the transmitter. This information generally plays a crucial role in determining what type of action should be taken in the presence of the detected transmitter. FIG. 2A shows a frequency-modulated signal, which is an example of an intercepted signal by a passive sensor system. The instantaneous frequency of this signal varies in time, as shown in FIG. 2C. The intercepted signal is down-converted by a conventional analog receiver system as shown, for example, in FIG. 4. The real part of output of the analog receiver system is shown in FIG. 2B, where synthetic noise is added to simulate an actual noisy reception. As seen from FIG. 2B, the detection of the signal can be a difficult task, especially for intercepted signals that have low amplitudes. Therefore, in cases where the detection of weaker signals in noise is extremely important, such as in early warning applications, more sophisticated detection algorithms are required. Similar to the case of active sensor systems, in accordance with the present invention reliable detection of signals in noise can be performed in the ambiguity-function domain by computing the auto-ambiguity function of the down-converted received signal as follows:

$$A_r(\tau,v) = \int r(t+\tau/2) r^*(t-\tau/2) e^{j2\pi vt} dt \quad (1.2)$$

where r(t) is the received signal. The real part of the noisy received signal is shown in FIG. 2B, and its corresponding auto-ambiguity function is shown in FIG. 2D. As seen in FIG. 2D, the intercepted signal is easily detectable in this plot. However, in practice the auto-ambiguity function approach is almost never used in the detection of intercepted signals due to the associated high cost and complexity. The main objective of the present invention in relation to the passive sensor systems is to provide an efficient and low-cost method and algorithm that makes use of the auto-ambiguity function for reliable detection and classification of intercepted signals.

The interested reader is directed to the disclosure of the following publications. Reference numerals used in the following description correspond to the numbering in the listing below.

[1] P. M. Woodward, *Probability and Information Theory, with Applications to Radar*, McGraw-Hill Book Co., Inc., pp. 115–125, 1953.

[2] V. Namias, "The fractional order Fourier transform and its application to quantum Mechanics", *J. Inst. Math Appl.*, vol. 25, pp. 241–265, 1980.

[3] W. Lohmann and B. H. Soffer, "Relationships between the Radon-Wigner and fractional Fourier transforms", J. Opt. Soc. Am. A, vol. 11, pp. 1798–1801, 1994.

[4] A. K. Özdemir and O. Arikan, "Fast computation of the ambiguity function and the Wigner distribution on arbitrary line segments", IEEE trans. Signal Process., vol. 49, no. 2, pp. 381–393, February 2001.

[5] A. K. Özdemir and O. Arikan, "Efficient computation of the ambiguity function and the Wigner distribution on arbitrary line segments", in Proc. IEEE Int. Symp. Circuits and Systems, vol. IV, pp. 171–174, May 1999.

[6] I. Raveh and D. Mendlovic, "New properties of the Radon transform of the cross-Wigner/ambiguity distribution function", *IEEE Trans. Signal Process.*, vol.47, no. 7, pp. 2077–2080, July 1999.

[7] D. Mendlovic and H. M. Ozaktas, "Fractional Fourier transforms and their optical implementation: I", *J. Opt. Soc. Am. A*, vol. 10, no. 9, pp. 1875–1881, 1993.

[8] H. M. Ozaktas and D. Mendlovic, "Fractional Fourier transforms and their optical implementation: II", *J. Opt. Soc. Am. A*, vol. 10, no. 12, pp. 2522–2531, 1993.

[9] H. M. Ozaktas, O. Arikan, M. A. Kutay and G. Bozdagi, "Digial computation of the fractional Fourier transform", *IEEE Trans. Signal Process.*, vol, 44, no. 9, pp. 2141–2150, September 1996.

[10] L. B. Almeida, "The fractional Fourier transform and time-frequency Representations", *IEEE Trans. Signal Process.*, vol. 42, no. 11, pp. 3084–3091, November 1994.

[11] L. Cohen, "Time-frequency distributions—A review", *Proc. IEEE*, vol. 77, no.7 pp. 941–981, July 1989.

[12] R. N. Bracewell, *The Fourier Transform and its Applications*, McGraw-Hill Book Company, pp. 356–381, 1978.

[13] G. H. Golub and C. F. Van Loan, *Matrix Computations*, Baltimore: John Hopkins University Press, pp. 206–259, 1996.

[14] P. W. East (ed.), *Advanced ESM Technology*, Microwave Exhibitions and Publishers Ltd., 1988.

[15] V. G. Nebabin, *Methods and Techniques of Radar Recognition*, Artech House, Inc., pp. 106–125, 1995.

[16] R. E. Blahut, W. Miller and Jr. C. H. Wilcox, *Radar and Sonar—Part I*, Springer-Verlag, vol. 32, pp. 1–29, 1991.

[17] R. E. Kalman, "A new approach to linear filtering and prediction problems", *J. Basic Engineering*, Trans. ASME Series D, vol. 82, pp. 35–45, 1960.

[18] Per-Olof Gutman and Mordekhai Velger, "Tracking Targets Using Adaptive Kalman Filtering", IEEE Trans. Aerospace and Electronic Systems, vol. 26, no. 5, pp. 691–699, September 1990.

[19] L. R. Rabiner, R. W. Schafer and C. M. Rader, "The Chirp z-Transform Algorithm", IEEE Trans. Audio and Electroacoustics, vol. AU-17, no. 2, pp. 86–92, June 1969.

Additional information is also provided in U.S. Pat. Nos. 5,760,732; 5,657,022; 5,583,505; 5,548,157 and 5,457,462, which are incorporated herein by reference.

SUMMARY OF THE INVENTION

The present invention is based on the simultaneous computation of distance and Doppler shift information using fast computation of the ambiguity function and/or Wigner distribution or received signals along on arbitrary line. By using the fractional Fourier transformation of time domain signals, closed form expressions for arbitrary projections of their auto or cross ambiguity function are derived. By utilizing discretizaiton of the obtained analytical expressions, efficient algorithms are proposed in accordance to the present invention to compute uniformly spaced samples of the Wigner distribution and the ambiguity function located on arbitrary line segments. With repeated use of the proposed algorithms, in alternative embodiments of the invention, samples in the Wigner or ambiguity domain can be computed on non-Cartesian sampling grids, such as polar grids, which are the natural sampling grids of chirp-like signals. The ability to obtain samples of the Wigner distribution and ambiguity function over both rectangular and polar grids is potentially useful in a wide variety of application areas, including time-frequency domain kernel design, multicomponent signal analysis, time-frequency domain signal detection and particle location analysis in Fresnel holograms.

BRIEF DESCRIPTION OF THE DRAWINGS

The advantages of the present invention will become apparent from the following description of the accompanying drawings. It is to be understood that the drawings are to be used for the purpose of illustration only, and not as a definition of the invention.

FIG. 1 is an illustration for an active sensor application in accordance with this invention, where

FIG. 2 is an illustration for a passive sensor application in accordance with this invention, where

FIG. 18 is a plot where

FIG. 20 is an illustration of the performance of the detection idea shown in FIG. 19 where

FIG. 24 is an illustration of how useful the projection domain signature used in accordance with the present invention for the classification of intercepted pulse signals. In particular.

FIG. 25 is an illustration of how useful the projection domain signature is in the classification of intercepted continuous signals.

DETAILED DESCRIPTION OF THE PREFERRED EMBODIMENTS

Figure 3:
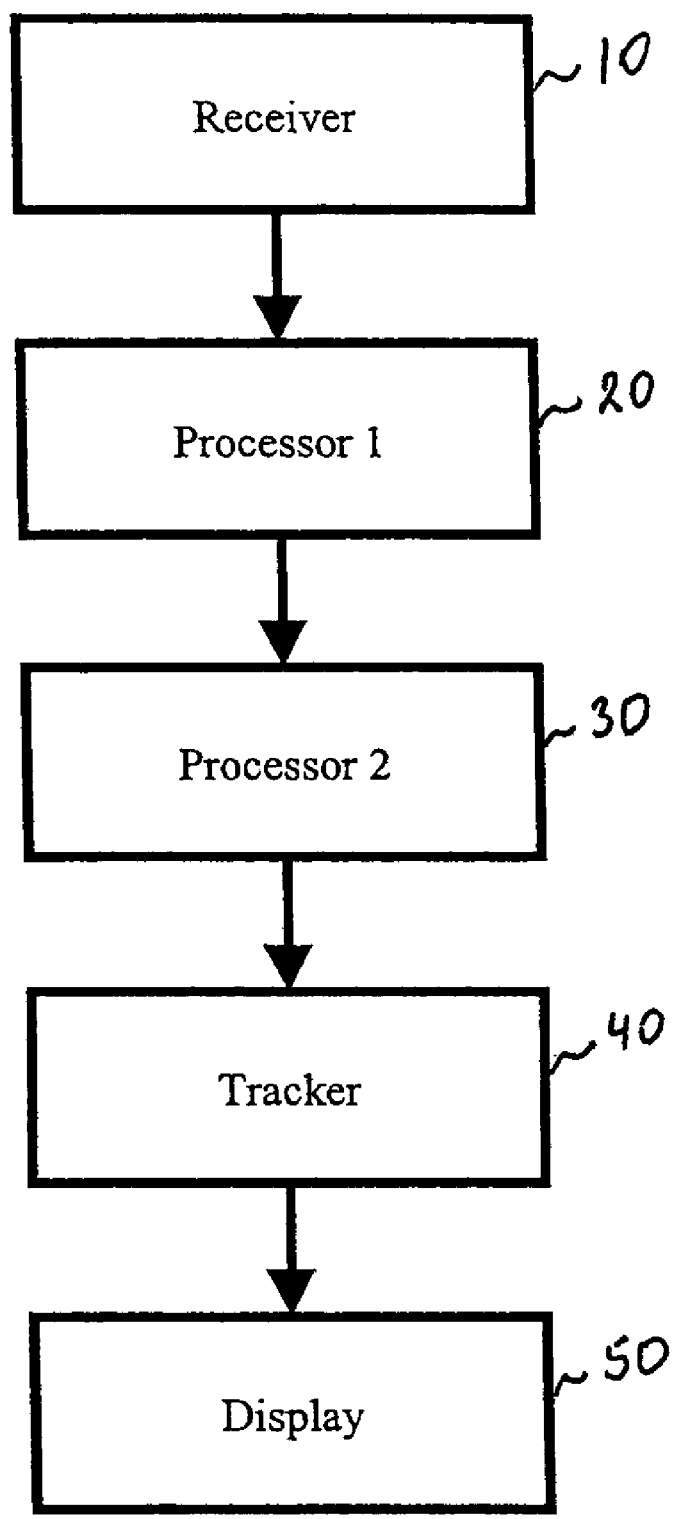
FIG. 3 is a block diagram illustrating a general structure of a system in accordance with the present invention using conventional receiver and display subsystems.

The present invention can be implemented using the generalized structure shown in FIG. 3, where conventional receiver and display subsystems are used along with various processing components of the system of the invention. This structure can be adapted to achieve the above mentioned goals for both the active and passive sensor applications. In the following sections, the preferred configuration for each of the embodiments of the invention are presented in detail.

Figure 4:
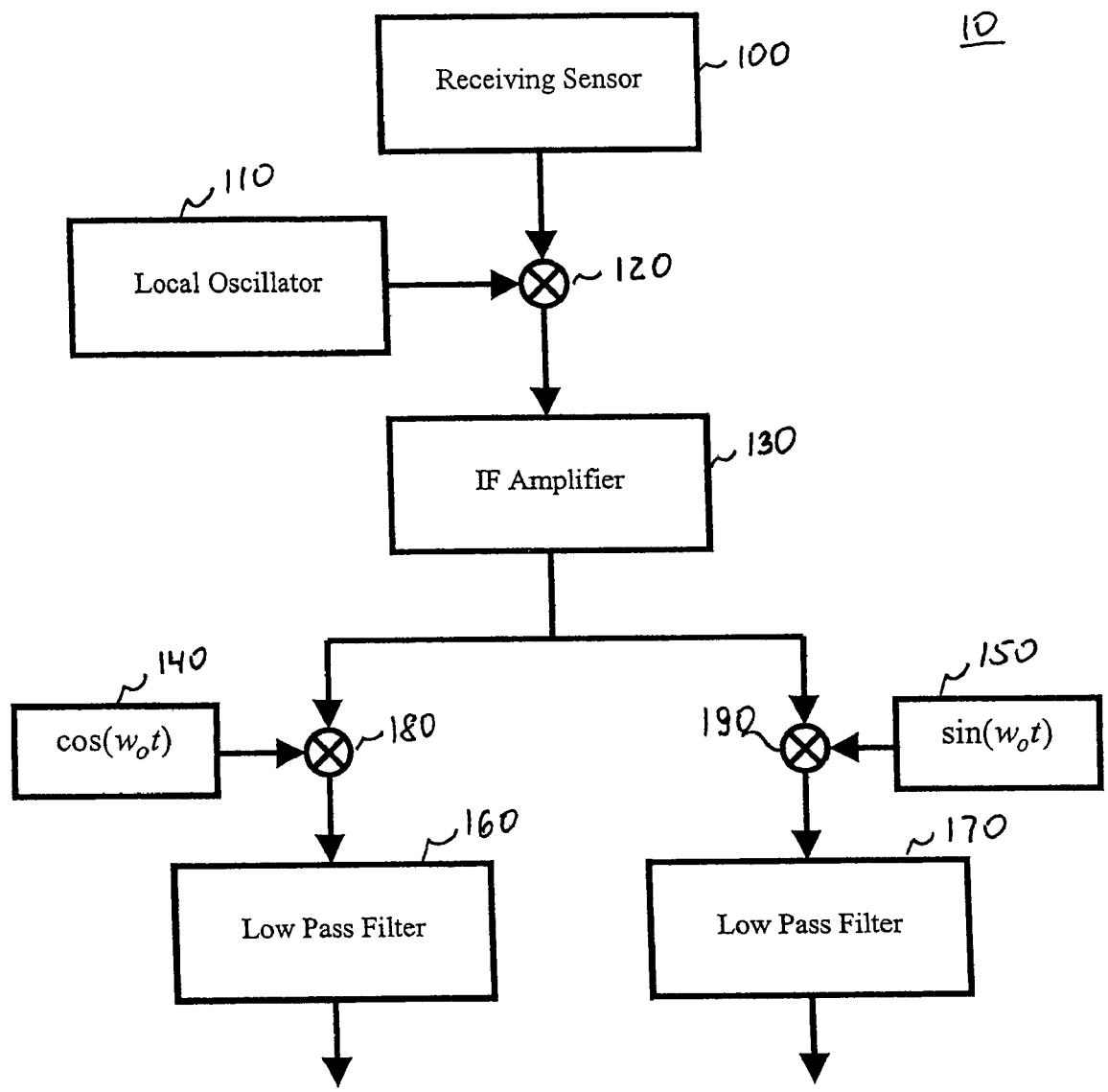
FIG. 4 is a block diagram illustrating the structure of a conventional analog receiver subsystem used in accordance with the present invention, which down-converts the received signal to the baseband to provide the inphase and quadrature signal components.

The receiver 10 of the system generally functions to receive the input signals, convert them to baseband signals that are typically detected in quadrature channels, and finally to filter the output. A more detailed block diagram of a receiver used in accordance with this invention is shown in FIG. 4, which illustrates a receiving sensor 100, local oscillator 110, the output of which multiplies the received signals in multiplier 120. Additional components of the system include IF amplifier 130 and two quadrature channels, using a sin(x)/cos(x) multiplication and filtering operation, as known in the art.

Processor blocks 20 and 30 generally form signal frames for further processing, preferably including time scaling. Further, processors 20, 30 compute various transformations of the input signal, which are designed to determine a time-frequency function of the (transmitted or) received signals and to detect peaks of the function, which are indicative of the presence of one or more targets, and their position and velocity at any time.

Tracking system 40 generally tracks the position of identified targets, and further communicates with the processors in determining optimum time windows, etc. Finally, display 50 shows output parameters to an operator. Individual blocks of the system are considered in more detail next.

A. THE FIRST SYSTEM PROCESSOR

Figure 5:
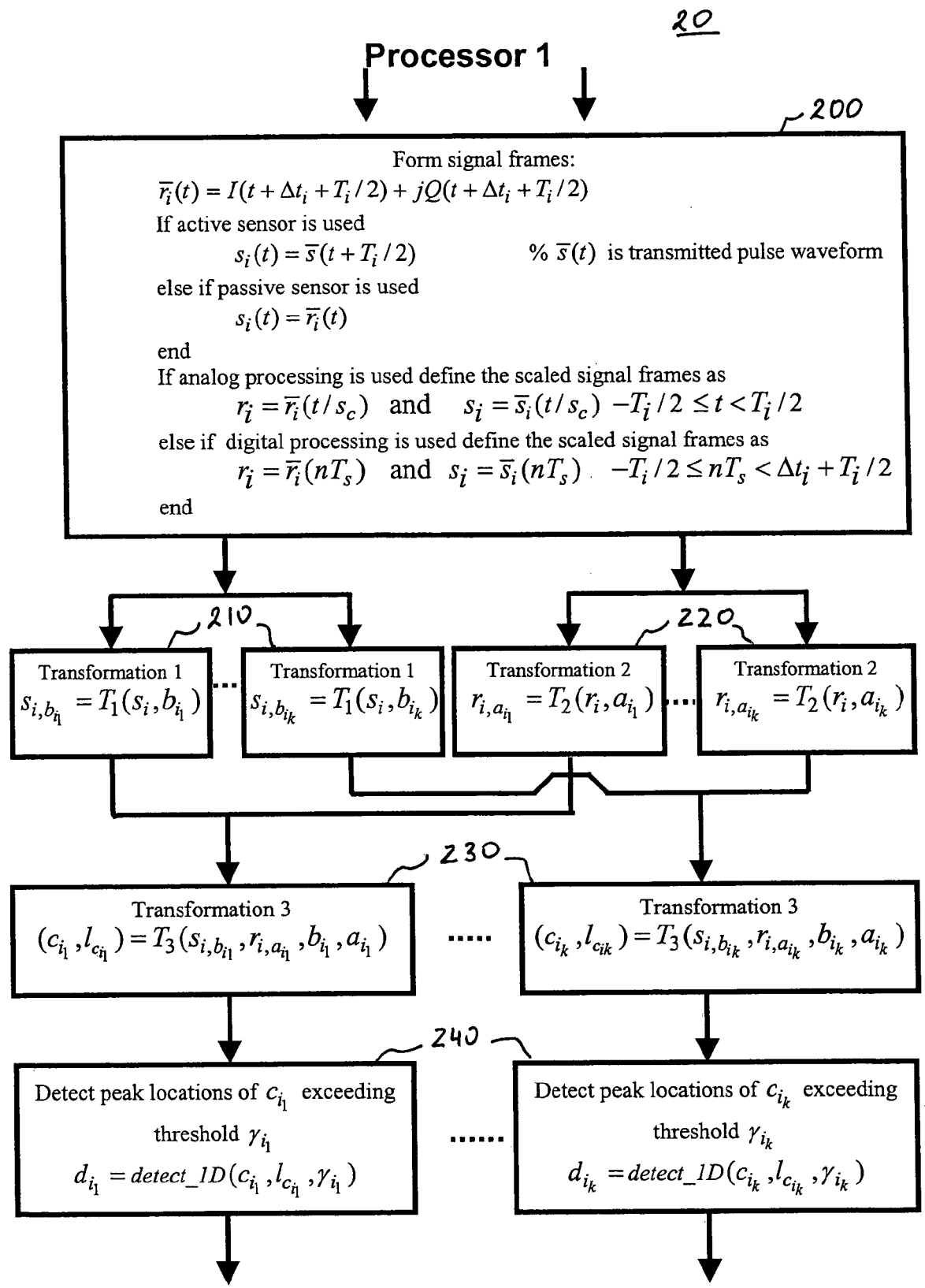
FIG. 5 is a block diagram illustrating a processing configuration in accordance with a first embodiment of the invention.
Figure 6:
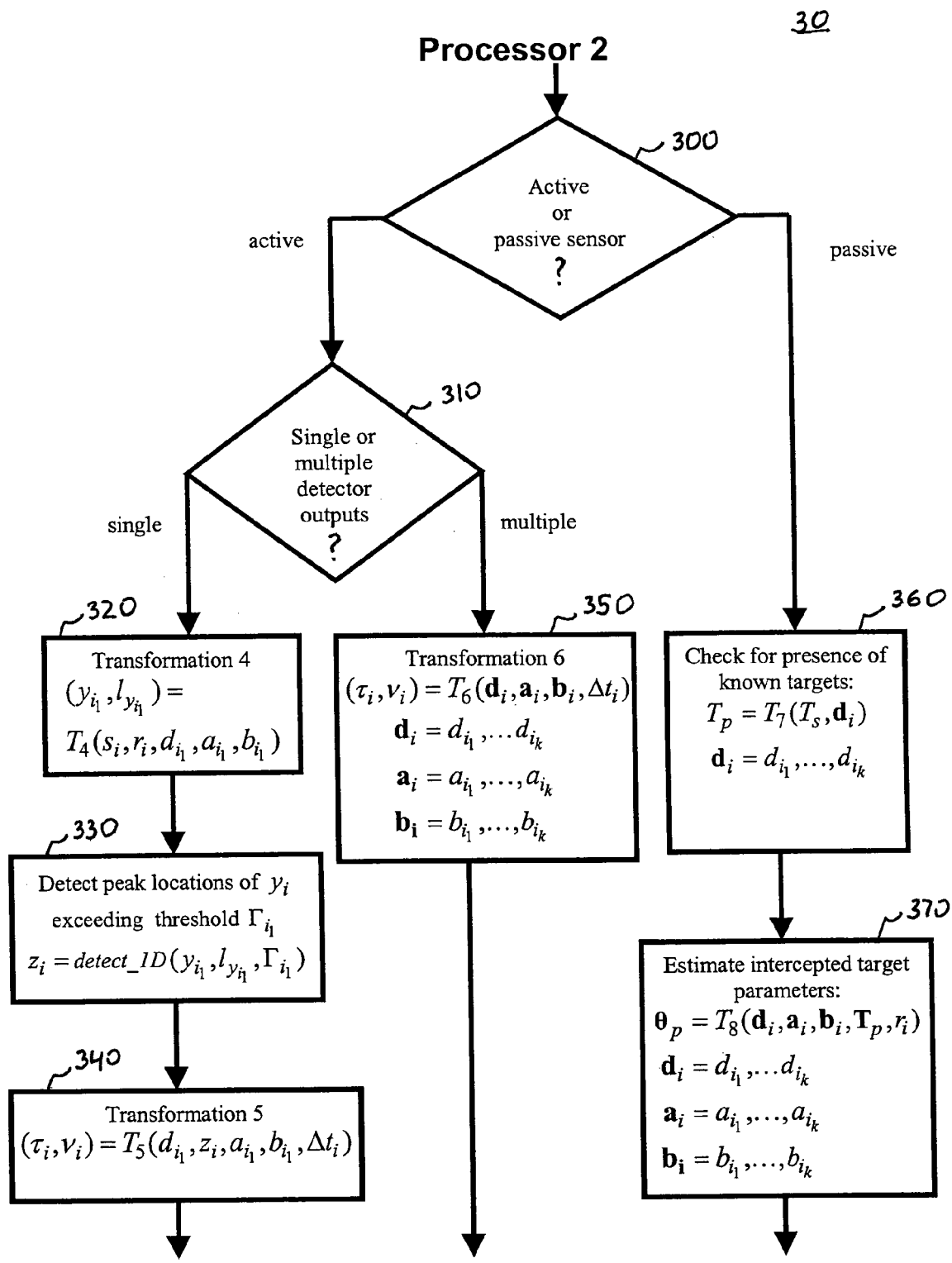
FIG. 6 is a block diagram illustrating a processing configuration in accordance with a second embodiment of the invention.
Figure 7:
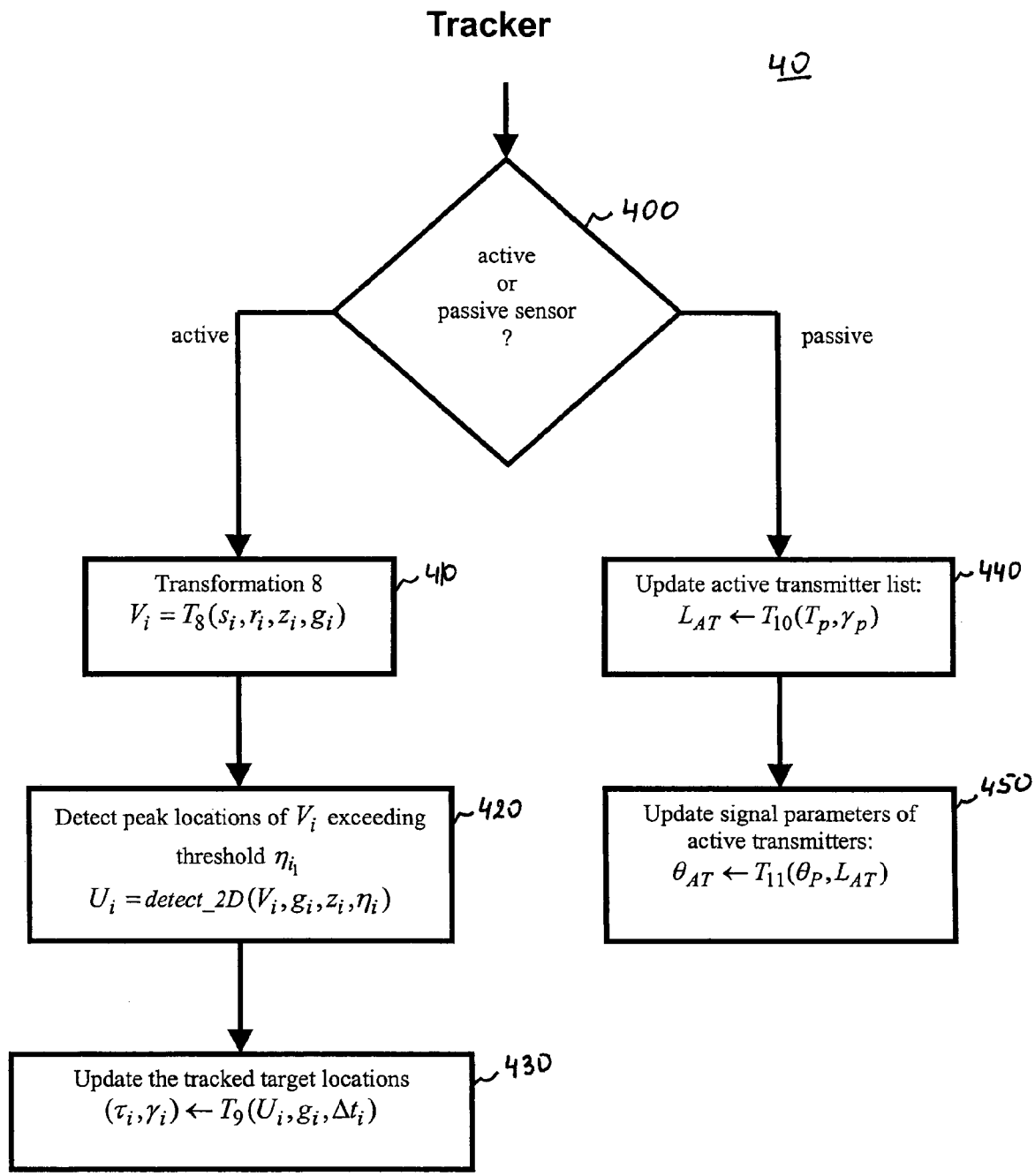
FIG. 7 is a block diagram illustrating a processing configuration in accordance with a third embodiment of the invention.
Figure 8:
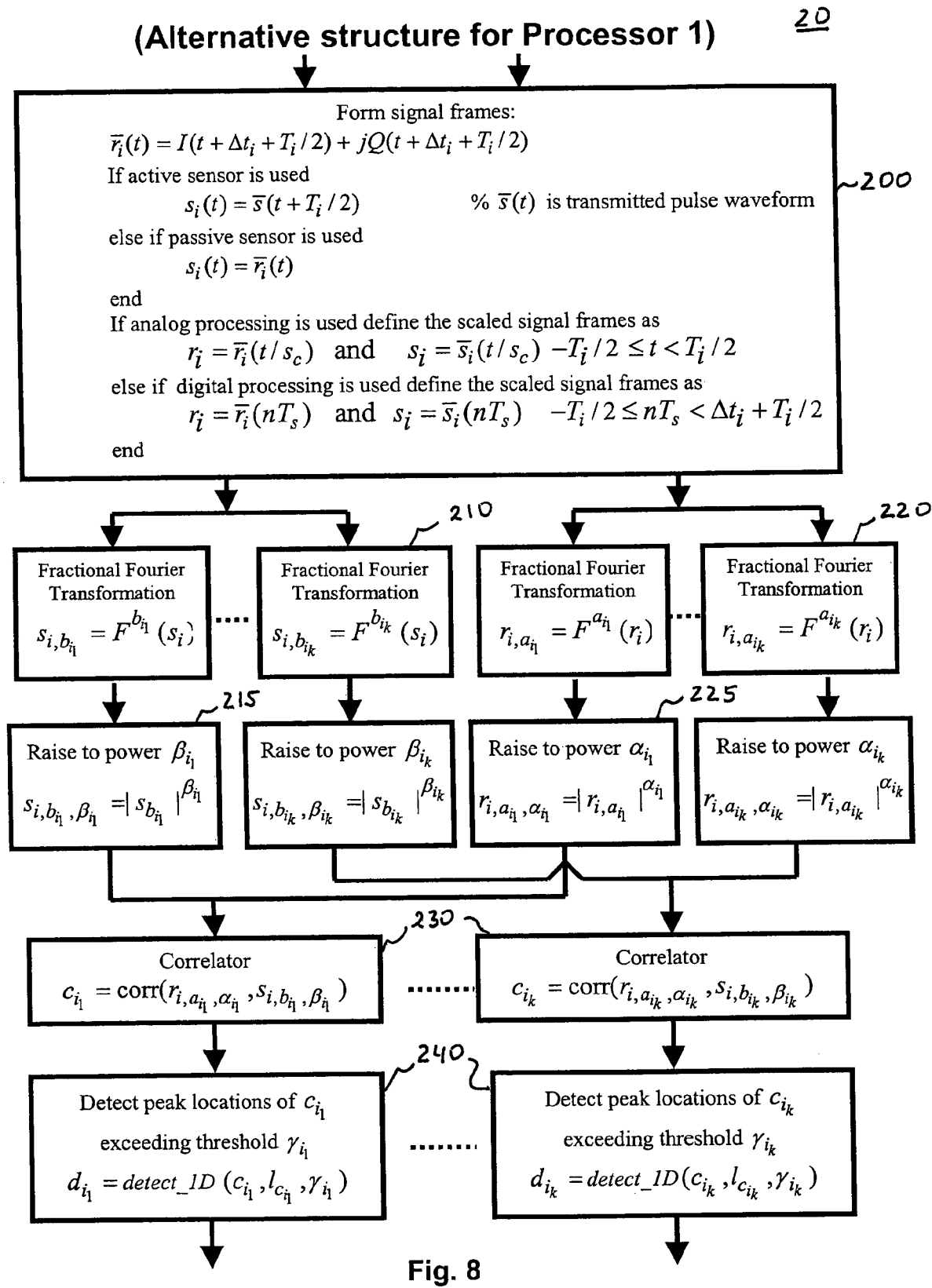
FIG. 8 is a detailed block diagram illustrating a processing configuration in an alternative embodiment of the invention.
Figure 9:
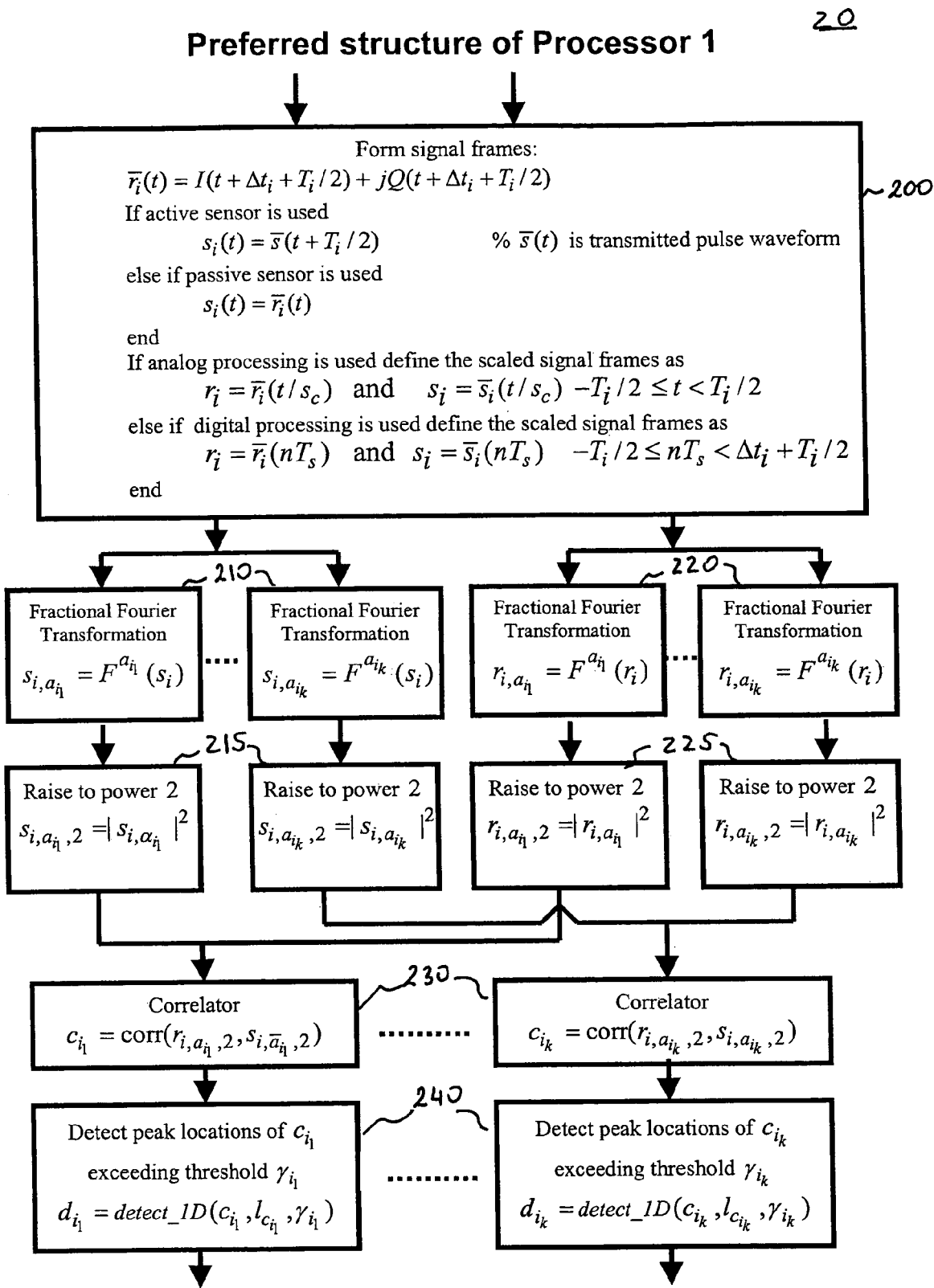
FIG. 9 is a block diagram illustrating the preferred configuration of a processor in accordance with one embodiment of the invention.

FIGS. 5, 8 and 9 illustrate to various level of detail the configuration and operation of the first processor subsystem used in accordance with the preferred embodiment shown in FIG. 4. Like processing blocks in these figures are likely labeled for convenience. Accordingly, to simplify the presentation, the discussion next focuses on the preferred embodiment of the processor shown in FIG. 9. As shown, in 200 the received signal is first segmented into frames for further processing. For an analog receiver these frames can be constructed as:

$$\bar{r} = 1(t + \Delta t_i + T_i/2) + jQ(t + \Delta t_i + T/2), \ -T_i/2 \le t < T_i/2. \quad (1.3)$$

By choosing the frame positions $\Delta t_i$'s and the frame durations $T_i$'s properly, the frames can be constructed as overlapping or non-overlapping, as desired. For improved computational efficiency, in the implementation of the preferred embodiments, the following time-scaled signals are used:

$$r_i(t) = \bar{r}_i(t/s_c) \quad (1.4)$$

For a signal with approximate time duration T and band width B the preferred scaling constant is given by [9]:

$$s_c = \sqrt{B/T} \quad (1.5)$$

For simplicity in the actual implementation, all of the constructed signal frames can be scaled with the same scaling constant. In this case, T should be chosen as the approximate time duration of the signal frame with the longest duration. Different scaling can be used in alternative embodiments.

Similarly, in accordance with the present invention, for a digital receiver the time-scaled signal frames are constructed from the available samples of the received signal as:

$$r_i[n] = r_i(n/(2\Delta r)) \quad (1.6)$$
$$= \bar{r}_i(nT_s)$$
$$= I(nT_s + N_oT_s) + jQ(nT_s + N_oT_s), \ -T_i/2 \le nT_s < T_i/2,$$

where $\Delta r$ is the square root of the time-bandwidth product TB of the signal $\bar{r}_i(t)$, $$T_s = 1/(2B)$$

denotes the sampling interval used by the digital receiver, and $N_0$ is the closest integer to $(\Delta t_i + T_i/2)/T_s$.

In the preferred embodiment shown in FIG. 9, following the formation of the signal frames, for each of the constructed signal frames, the corresponding fractional Fourier transform is obtained in 210, 220. The fractional Fourier transformation is a generalization of the ordinary Fourier transformation that can be interpreted as a rotation by an angle in the time-frequency plane [2]. If the receiver provides analog signals, the following continuous fractional Fourier transformation is applied to the constructed signal frame:

$$r_{i,\alpha_{ij}}(t) = \{F^{\alpha_{ij}} r_i\}(t) = \int B_{\alpha_{ij}}(t,t') r_i(t') dt' \quad (1.7)$$

where $\alpha_{ij}$ is the order of the fractional Fourier transformation, and $B_{\alpha_{ij}}[t,t']$ is the kernel of the transformation defined as:

$$B\alpha_{ij}(t,t') = A_{\phi_{ij}} \exp[j\pi(t^2 \cot\phi_{ij} - 2tt' \csc\phi_{ij} + t'^2 \cot\phi_{ij})], \quad (1.8)$$

where the transformation angle $\phi_{ij} = \alpha_{ij} \times \pi/2$, and the scaling constant $A_{\phi_{ij}}$ is defined as:

$$A_{\phi_{ij}} = \frac{\exp(-j\pi \operatorname{sgn}(\sin\phi_{ij})/4 + j\phi_{ij}/2)}{|\sin\phi_{ij}|^{1/2}}, \quad (1.9)$$

Figure 12:
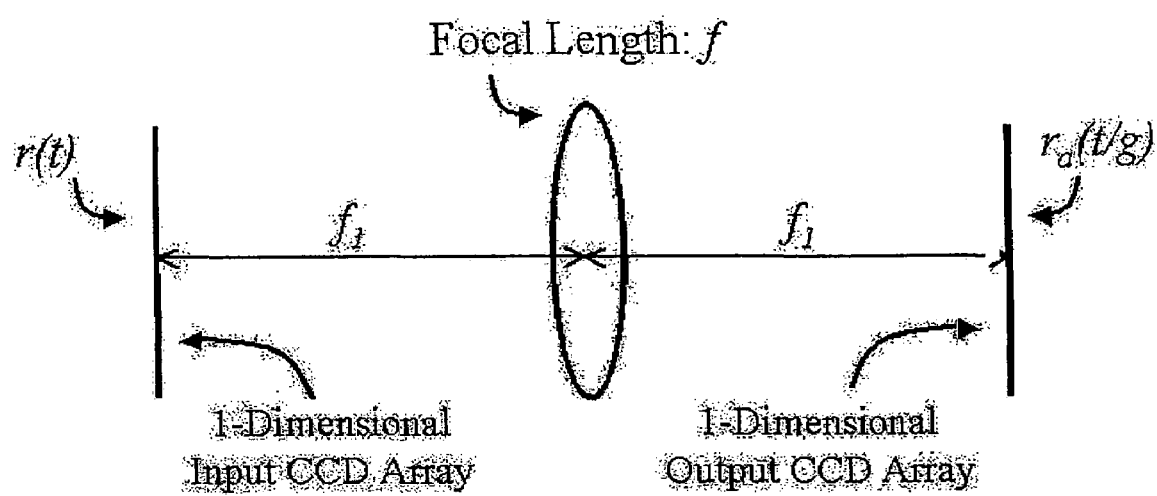
FIG. 12 illustrates an optical hardware that can be used to compute the continuous fractional Fourier transformation in a specific embodiment of the present invention.

If the order $\alpha_{ij}$ is chosen as 1, the fractional Fourier transformation corresponds to the ordinary Fourier transformation. Continuous fractional Fourier transformation has very important relationships to both the ambiguity function and the Wigner distribution [3], [4], [5], [6]. The above-given form of the fractional Fourier transformation can be computed in a preferred embodiment by using an appropriate hardware, such as the one shown in FIG. 12, which consists of a pair of CCD arrays and a lens located in between [7], [8]. In the preferred embodiment shown in FIG. 9, one or more fractional Fourier transformations 210, 220 are computed. The orders $\alpha_{ij}$ of the fractional Fourier transformation are decided preferably prior to the actual implementation by taking into account the received signal and clutter properties. The details of the how these orders can be chosen in practice are discussed below.

In the case of a digital receiver, several algorithms can be utilized to efficiently obtain close approximations to the uniformly spaced samples of the continuous fractional Fourier transform. For completeness, such as an efficient computational algorithm is given in Appendix A [4], [5]. By using the tabulated algorithm, the following set of discrete fractional Fourier transformations are computed for each of the constructed signal frames:

$$r_{i,a_{i_j}} = \begin{cases} \sum_{n'} B_{a_{i_j}}[n,n']r_i[n'], & |a_{i_j}| \in [0.5, 1.5] \\ \sum_{n'} B_{(a_{i_j}-1)}[n,n']R_i[n'], & |a_{i_j}| \in [0, 0.5) \cup (1.5, 2) \end{cases}, \quad (1.10)$$

where $r_i[n]$ is given in (1.6) and $R_i[n]$ is the discrete Fourier transform of $r_i[n]$ given as $$R_i[n] = \frac{1}{2B} \sum_{n'} r_i[n'] e^{-j\frac{\pi n n'}{2(\Delta r)^2}}, \quad (1.11)$$

where $\Delta r$ is the square root of the time-bandwith product TB of the signal $\bar{r}_i(t)$. The kernel of the transformation $B_{\alpha_{ij}}[n,n']$ is defined as:

$$B_{a_{i_j}}[n,n'] = \frac{1}{2\Delta r} A_{\phi_{ij}} \exp\left[j\frac{\pi}{4(\Delta r)^2}(n^2 \cot\phi_{ij} - 2nn' \csc\phi_{ij} + n'^2 \cot\phi_{ij})\right], \quad (1.12)$$

where the transformation angle $\phi_{ij}=\alpha_{ij}\pi/2$, and the scaling constant $A_{\phi_{ij}}$ are defined as in Eq. (1.9). The discrete fractional Fourier transformation has very important relationships to the continuous fractional Fourier transformation, and it can be used to approximate samples of the continuous transformation:

$$r_{i,a_{i_j}}[n] \cong r_{i,a_{i_j}}(n/(2\Delta r)) \quad [9].$$

The above-given form of the discrete fractional Fourier transformation can be computed efficiently by using algorithms that make use of fast Fourier transformation [9]. For completeness, an efficient computational algorithm is given in Appendix A [9]. In actual real-time implementations, such a fast computational algorithm preferably is programmed in an integrated chip. The orders of the discrete fractional Fourier transformations can be chosen as in the continuous case by investigating the properties of the received signal and clutter.

The preferred configuration of the first embodiment shown in FIG. 9 is designed for both the active and passive sensor systems. In the case of active sensor applications, $s_i$ in block FIG. 9 is set to be the transmitted signal delayed with $T_i/2$. In the case of passive sensor applications, $s_i$ in block FIG. 9 is set to be the i-th received signal frame. Then, $s_i$ is also transformed into multiple fractional Fourier domains. In the preferred configuration, the orders of the fractional Fourier transformations are chosen to be the same as the orders used in the fractional Fourier transformations applied on the received signal frame in 220. Therefore, in passive sensor applications, the fractional Fourier transformations of $s_i$ are identical to those of $r_i$. Hence, it is not necessary to compute the fractional Fourier transformations of $s_i$. In the case of active sensor applications with a digital receiver, such a computational efficiency can be achieved by computing the required fractional Fourier transformations on the transmitted signal in advance, and storing the results in a digital memory to be retrieved when necessary.

The results of the computed fractional Fourier transformations are complex valued signals. In the following processing blocks 215, 225, by computing their squared magnitudes, they are converted to real valued signals as:

$$s_{i,a_{i_j},2}(t) = |s_{i,a_{i_j}}(t)|^2 \quad (1.13)$$

$$r_{i,a_{i_j},2}(t) = |r_{i,a_{i_j}}(t)|^2.$$

Then, in blocks 230 the correlation between the obtained $s_{i,\alpha ij,2}$ and $r_{i,\alpha_{ij},2}$ is computed as:

$$c_{ij}(\rho) = corr(r_{i,a_{i_j},2}(\rho), s_{i,a_{i_j},2}(\rho)) \quad (1.14)$$

$$= \int r_{i,a_{i_j},2}(\rho+t) s^*_{i,a_{i_j},2}(t) dt$$

$$= \int |r_{i,a_{i_j}}(\rho+t)|^2 |s_{i,a_{i_j}}(t)|^2 dt.$$

Finally, a standard detector is used in 240 on the obtained correlation results to identify the presence of peaks above the expected noise floor. Locations of identified peaks are used as part of the processing in the second processor 30, as shown in FIG. 3. The underlying fundamental relationship between the identified peaks and the presence of an object is investigated in detail below.

Figure 13:
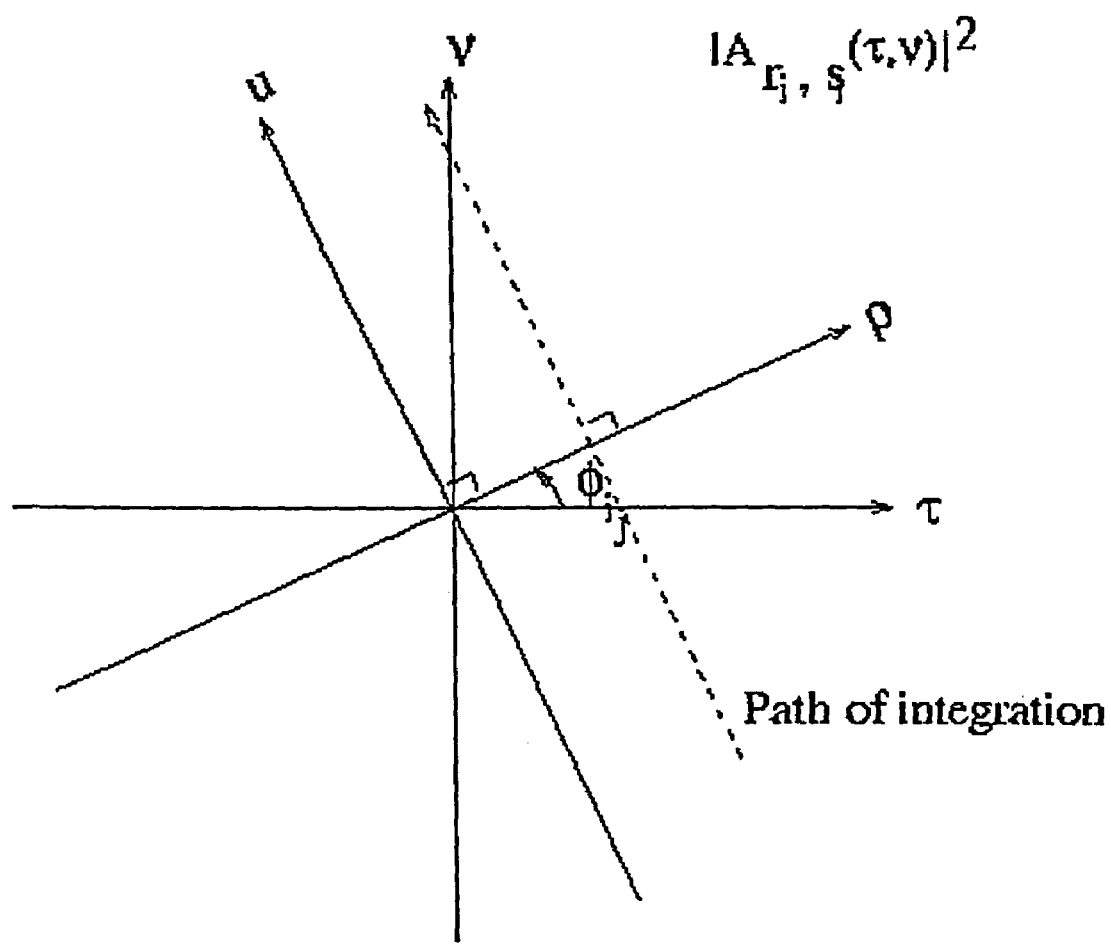
FIG. 13 illustrates the projection geometry for the magnitude squared ambiguity function used in a preferred embodiment of the present invention.
Figure 14:
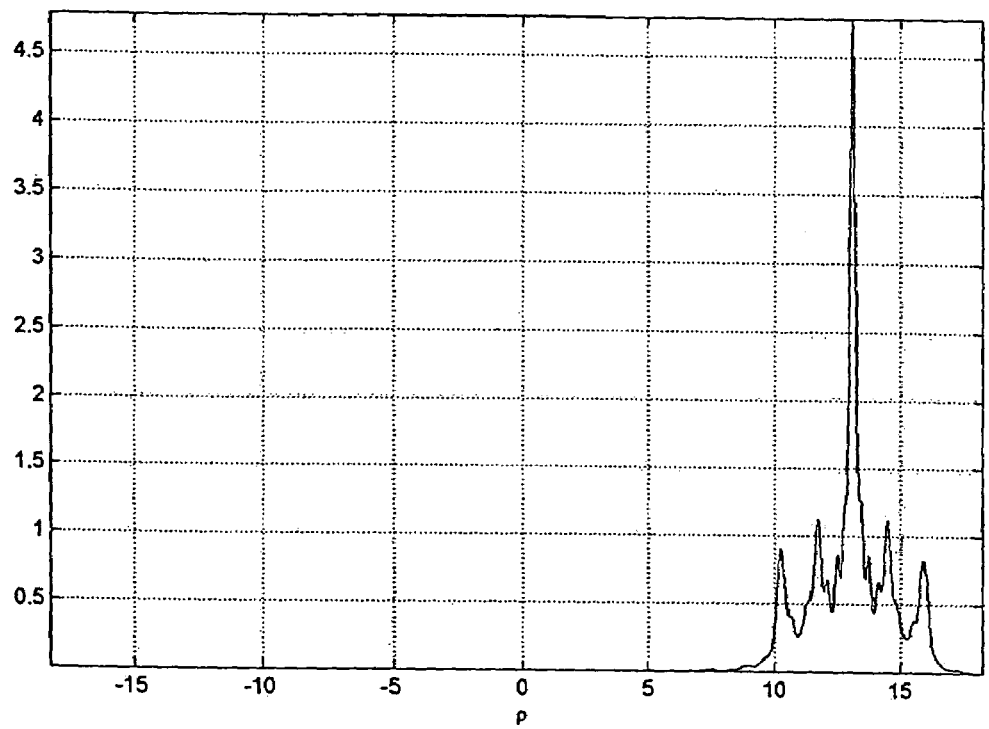
FIG. 14 is a plot that shows the 32.7 degree projection of the magnitude squared cross-ambiguity function of the signals shown in FIG. 1A and FIG. 1B.
Figure 15:
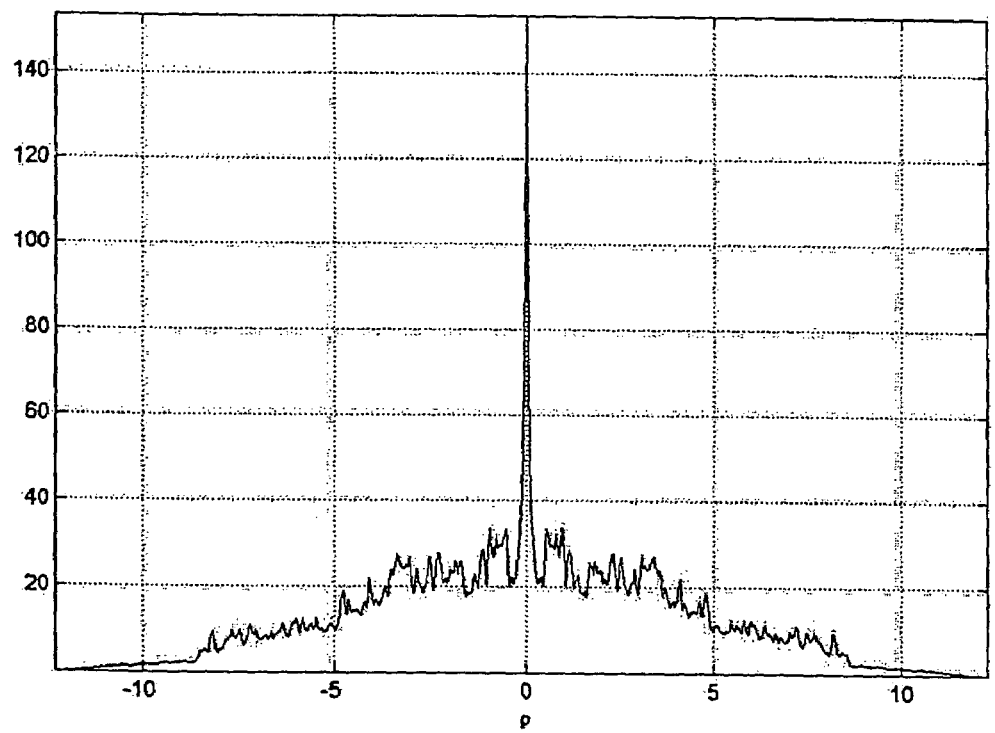
FIG. 15 is a plot that shows the 50.0 degree projection of the magnitude squared auto-ambiguity function of the signal shown in FIG. 2C.

As mentioned above, the ambiguity function reveals the presence of an object in both active and passive sensor applications. However, due to the associated complexity in the implementation of the required processing, detection on the ambiguity domain is rarely used in practice. In this patent application, an alternative method of detection of an object in the ambiguity domain is proposed. In this new approach, projections of the magnitude squared ambiguity function are used to detect the presence of an object. These projections are defined as:

$$P_{r_i,s_i}(\rho,\phi_{ij}) = \int |A_{r_i,s_i}(\rho\cos\phi_{ij} - u\sin\phi_{ij}, \rho\sin\phi_{ij} + u\cos\phi_{ij})|^2 du, \quad (1.15)$$

where $\rho$ is the projection domain variable and $\phi_{ij}$ is the projection angle, as shown in FIG. 13. In order to demonstrate the effectiveness of detecting objects in the projections of the magnitude squared ambiguity function, the examples given in FIG. 1 and FIG. 2 are examined next. For these two examples, the above defined projections are computed at projection angles 32.7° and 50.0°, respectively, and their corresponding results are shown in FIG. 14 and FIG. 15. As seen from the obtained results, the presence of the object is readily detectable in the computed projections. However, if these projections are computed based on the given formula in Eq. (1.15), the required computation will be even more complicated than the detection based on the ambiguity function domain. Therefore, in a preferred embodiment, an alternative method is presented for efficient computation of the required projections.

A simplified form for the expression in Eq. (1.15) can be obtained by using the following rotation property relating the ambiguity function and the fractional Fourier transformation:

$$A_{r_i,s_i}(\rho\cos\phi_{i_j} - u\sin\phi_{i_j}, \rho\sin\phi_{i_j} + u\cos\phi_{i_j}) = A_{r_{i,a_{i_j}},s_{i,a_{i_j}}}(\rho, u), \quad (1.16)$$

where $$r_{i,a_{i_j}}(t)$$

and $$s_{i,a_{i_j}}(t)$$

are the $(\alpha_{ij})^{th}$ order fractional Fourier transforms of $r_i(t)$ and $s_i(t)$. This property of the fractional Fourier transform essentially means that the ambiguity function of the fractional Fourier transformed signals $$A_{r_{i,a_{i_j}},s_{i,a_{i_j}}}$$

is the same as the rotated ambiguity function $A_{r_i,s_i}$ with an angle of rotation equal to the transformation angle $\phi_{i_j}$. Although this relationship is presented for the first time in this patent application, it can be obtained from the following well-known rotating property between the Wigner distribution and the fractional Fourier transformation [3]

$$W_{r_i}(\rho\cos\phi_{i_j} - u\sin\phi_{i_j}, \rho\sin\phi_{i_j} + u\cos\phi_{i_j}) = W_{r_{i,a_{i_j}}}(\rho, u). \quad (1.17)$$

First, this well known rotation property for auto-Wigner distribution is generalized to the cross-Wigner distribution:

$$W_{r_i,s_i}(\rho\cos\phi_{i_j} - u\sin\phi_{i_j}, \rho\sin\phi_{i_j} + u\cos\phi_{i_j}) = W_{r_{i,a_{i_j}},s_{i,a_{i_j}}}(\rho, u). \quad (1.18)$$

Then, by using the fact that there is a 2-D Fourier relation between the cross-ambiguity function and the cross-Wigner distribution [11], and by recalling that 2-D Fourier transform of a rotated signal is the same as the rotated 2-D Fourier transform of the original, the relation in Eq. (1.16) can be obtained.

Thus by using the rotation property given in Eq. (1.16), the projection given in Eq. (1.15) can be written as:

$$P_{r_i,s_i}(\rho, \phi_{i_j}) = \int |A_{r_{i,a_{i_j}},s_{i,a_{i_j}}}(\rho, u)|^2 du, \quad (1.19)$$

in terms of the fractional Fourier transforms $$r_{i,a_{i_j}}(t)$$

and $$s_{i,a_{i_j}}(t).$$

Then, by using the definition of the cross-ambiguity function in Eq. (1.11), the projection given by Eq. (1.19) can be written as:

$$P_{r_i,s_i}(\rho, \phi_{i_j}) = \int\int\int r_{i,a_{i_j}}(t' + \rho/2)s^*_{i,a_{i_j}}(t' - \rho/2)r^*_{i,a_{i_j}} \quad (1.20)$$
$$(t'' + \rho/2)s_{i,a_{i_j}}(t'' - \rho/2)e^{j2\pi u(t'-t'')}dt'dt''du$$
$$= \int\int r_{i,a_{i_j}}(t' + \rho/2)s^*_{i,a_{i_j}}(t' - \rho/2)r^*_{i,a_{i_j}}$$
$$(t'' + \rho/2)s_{i,a_{i_j}}(t'' - \rho/2)\delta(t' - t'')dt'dt'',$$

where $\delta(t)$ is the Dirac-delta function [12]. Then, by using the sifting property of the Dirac-delta function, the expression for the projection can be simplified into:

$$P_{r_i,s_i}(\rho, \phi_{i_j}) = \int |r_{i,a_{i_j}}(t' + \rho/2)|^2 |s_{i,a_{i_j}}(t' - \rho/2)|^2 dt'. \quad (1.21)$$

Finally, by changing the variable of integration with $t+\rho/2$, the expression for the projection given by Eq. (1.21) can be expressed as:

$$P_{r_i,s_i}(\rho, \phi_{i_j}) = \int |r_{i,a_{i_j}}(t + \rho)|^2 |s_{i,a_{i_j}}(t)|^2 dt \quad (1.22)$$
$$= corr(r_{i,a_{i_j},2}(\rho), s_{i,a_{i_j},2}(\rho)).$$

In this final form, the required projection is the same as the correlation of $$r_{i,a_{i_j},2}(\rho)$$

and $$s_{i,a_{i_j},2}(\rho).$$

Thus, the computed correlation $c_{i_j}(\rho)$ in Eq. (1.14) is the desired projection $P_{r_i,s_i}(\rho,\phi_{i_j})$. Therefore, by using this relationship, in the preferred implementation of the first processor 20 of the system, these projections are obtained very efficiently. Similarly, for a digital receiver, the required projections can be approximated as:

$$P_{r_i,s_i}(m/(2\Delta r), \phi_{i_j}) \cong 1/(2\Delta r) \sum_n |r_{i,a_{i_j}}((n+m)/(2\Delta r))|^2 \quad (1.23)$$

$$|s_{i,a_{i_j}}(n/(2\Delta r))|^2$$

$$\cong 1/(2\Delta r) \sum_n |r_{i,a_{i_j}}[n+m]|^2 |s_{i,a_{i_j}}[n]|^2$$

$$= 1/(2\Delta r)corr(|r_{i,a_{i_j}}[m]|^2, |s_{i,a_{i_j}}[m]|^2),$$

where $$r_{i,a_{i_j}}[n]$$

and $$s_{i,a_{i_j}}[n]$$

are the discrete fractional Fourier transformation given by Eq. (1.10).

Figure 1A:
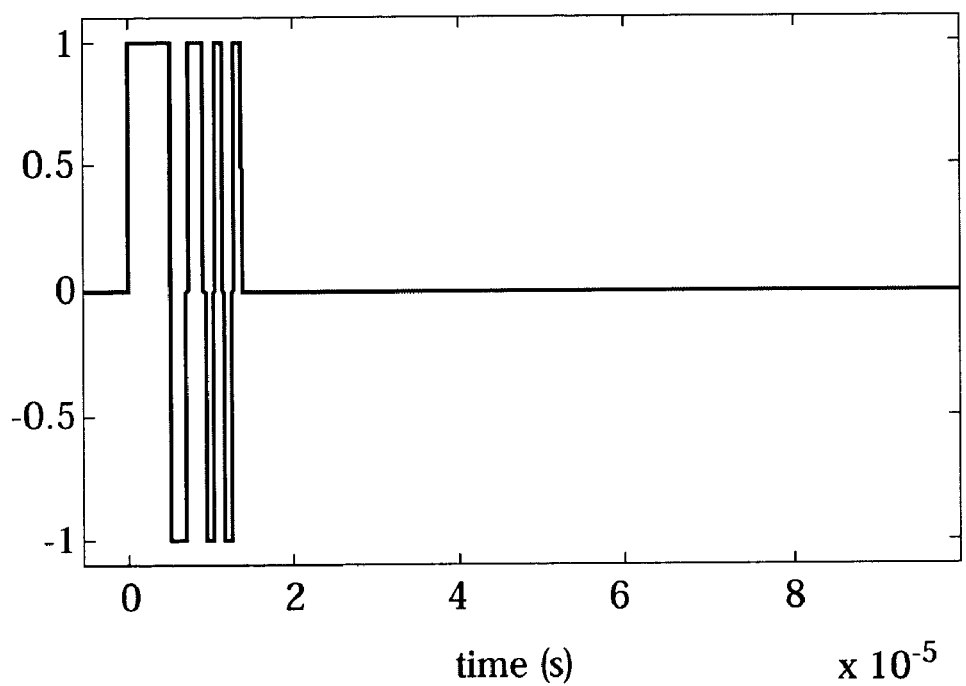
FIG. 1A shows the transmitted signal.
Figure 1B:
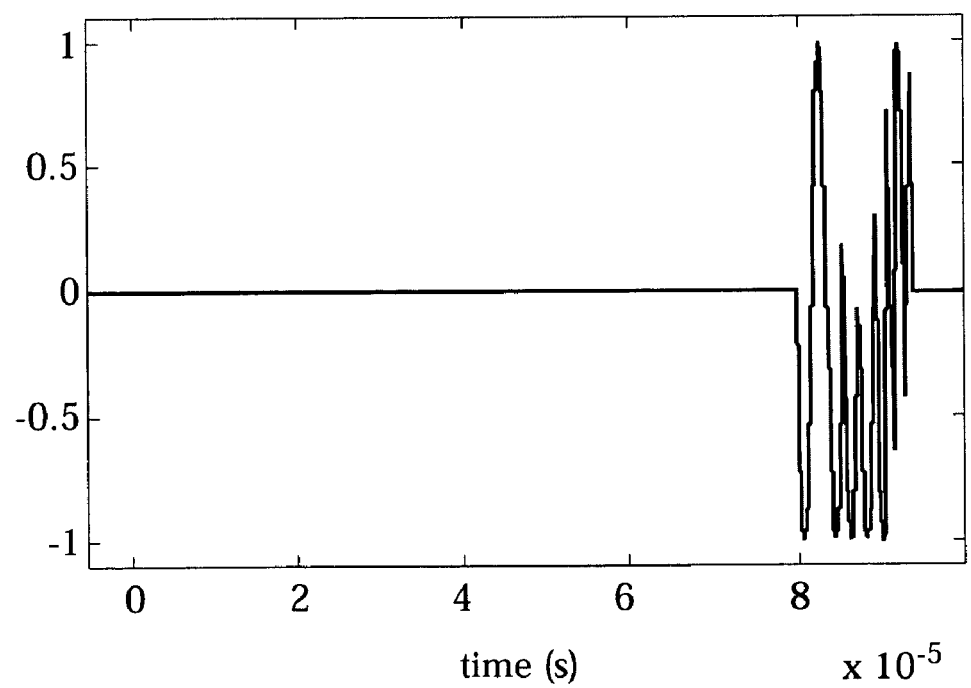
FIG. 1B illustrates the received signal.
Figure 1C:
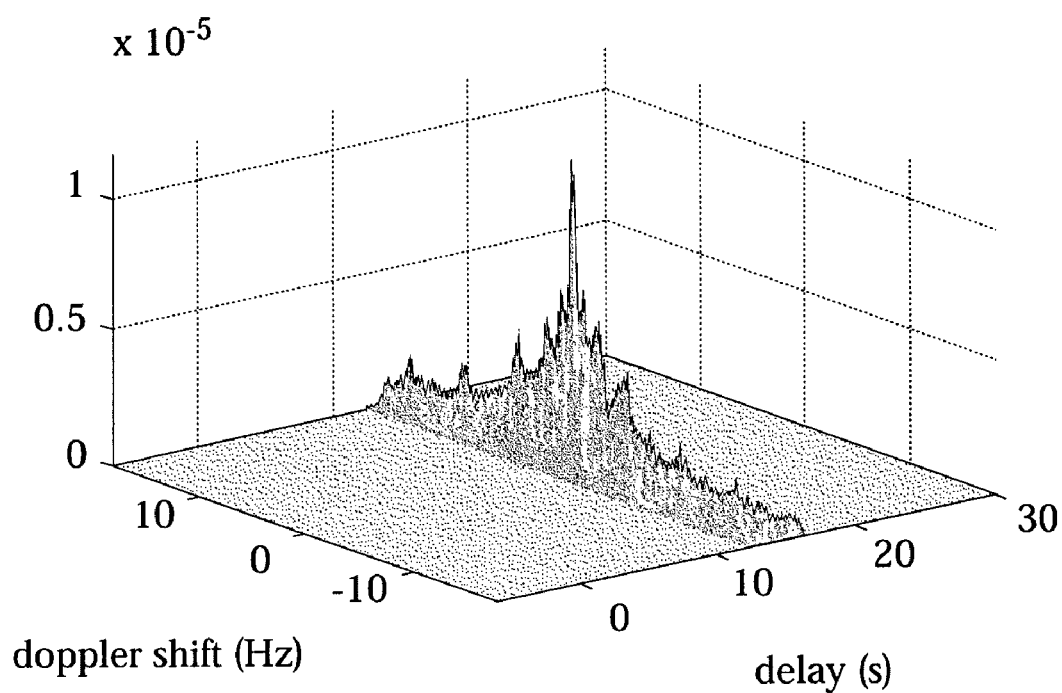
FIG. 1C is a 3-dimensional plot of the cross-ambiguity function of the received and transmitted signals.
Figure 1D:
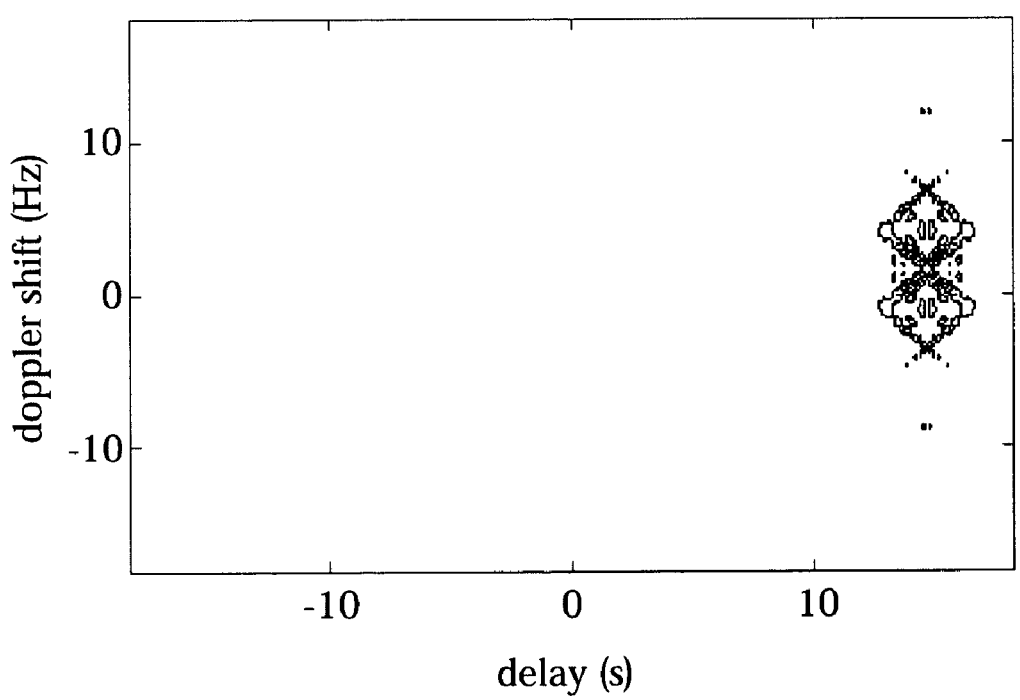
FIG. 1D shows the 2-D contour plot of the cross-ambiguity function of the received and transmitted signals.
Figure 2A:
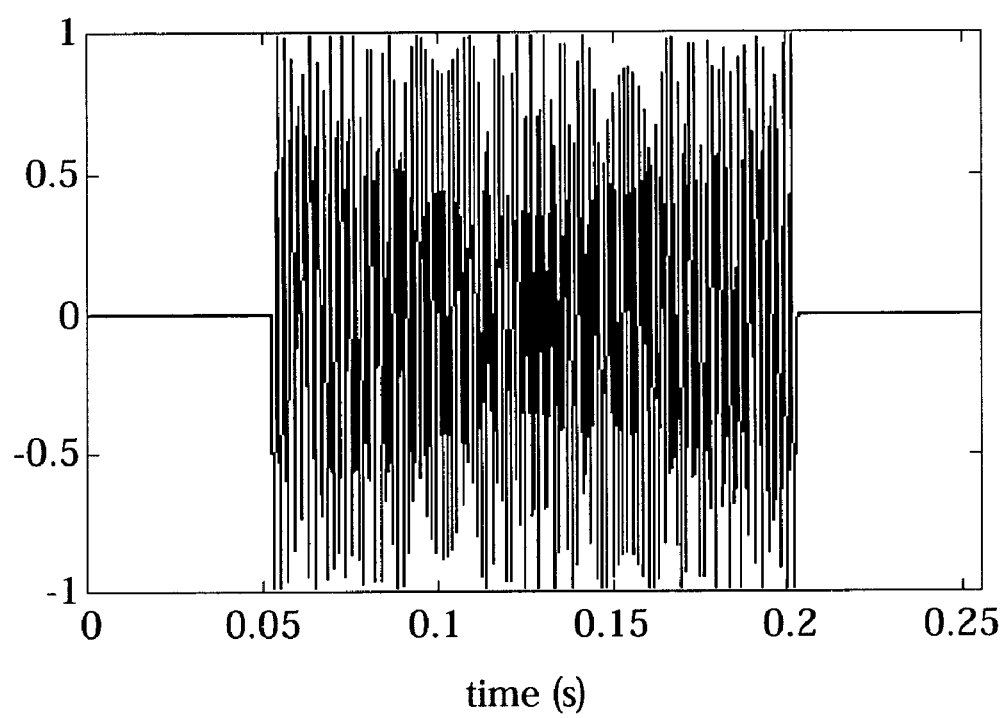
FIG. 2A shows the frequency-modulated signal intercepted by a passive sensor system.
Figure 2B:
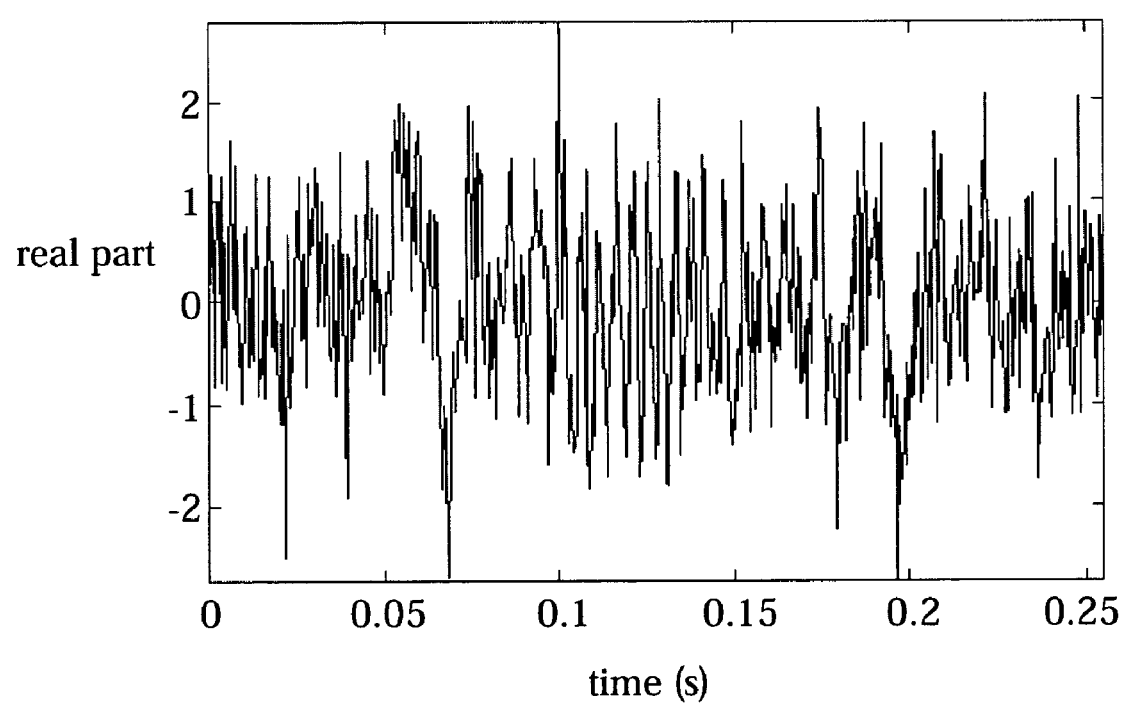
FIG. 2B shows the down-converted received signal for an analog receiver.
Figure 2C:
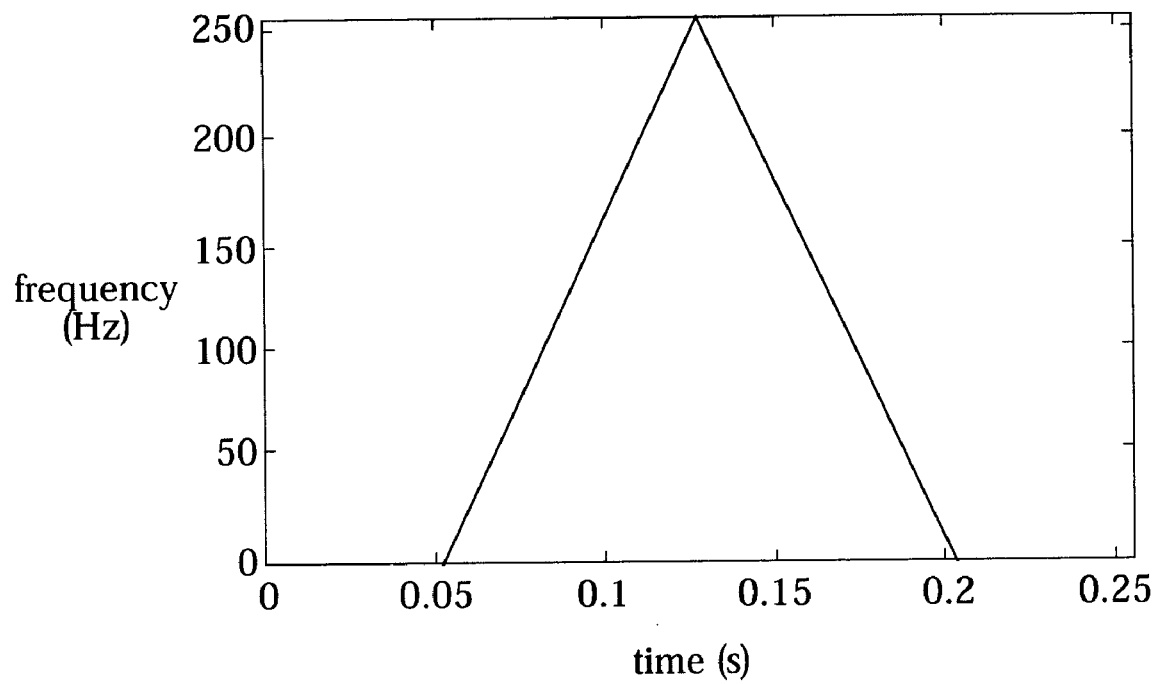
FIG. 2C shows the instantaneous frequency of the intercepted signal.
Figure 2D:
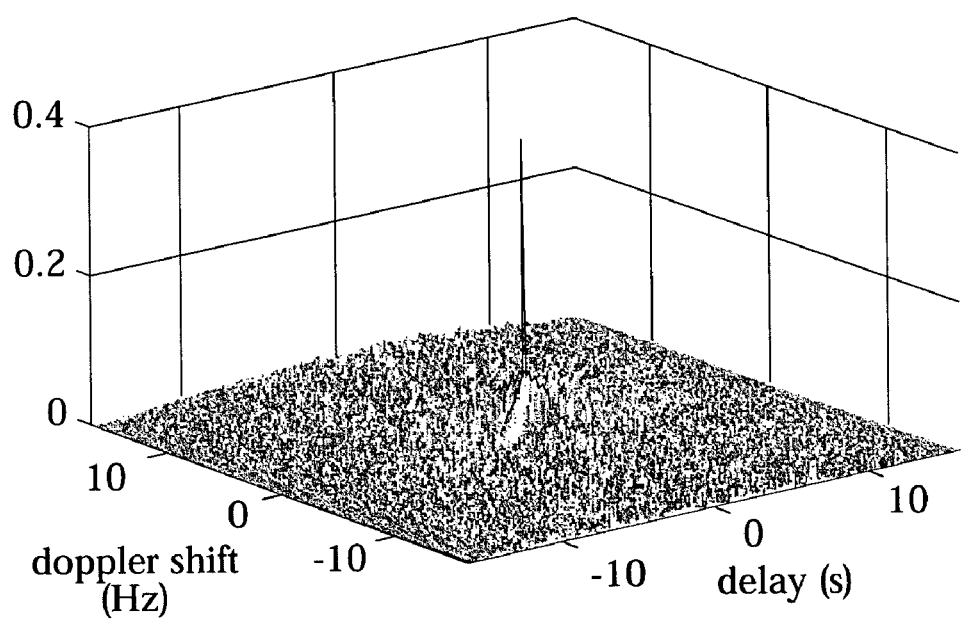
FIG. 2D illustrates the 3-dimensional plot of the auto-ambiguity function of the down-converted received signal.
Figure 16:
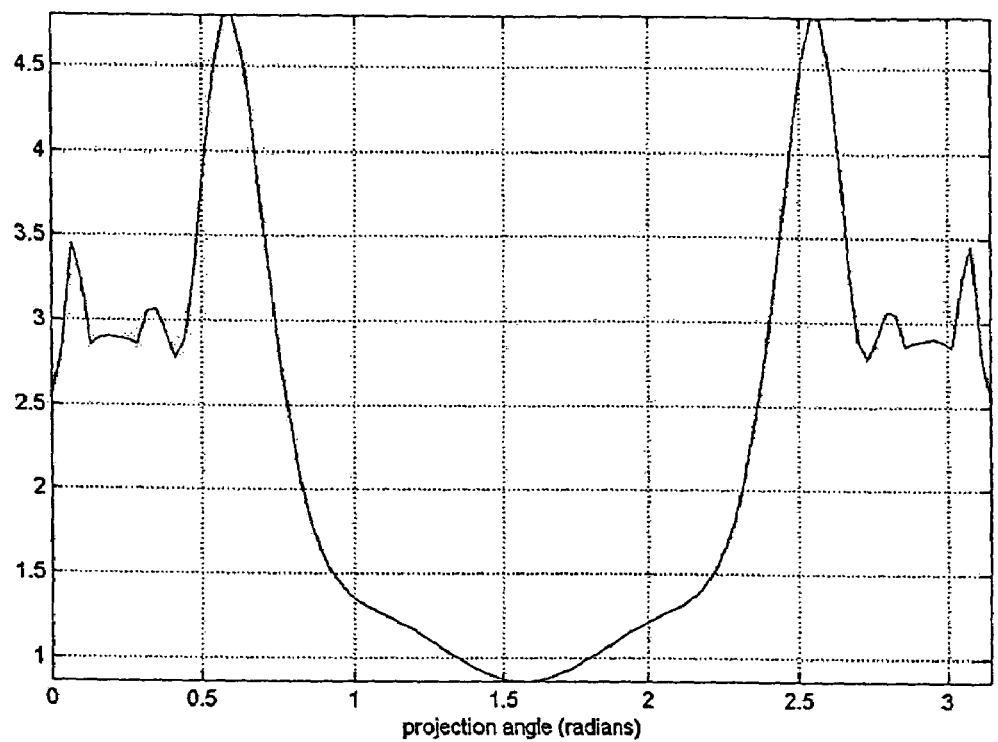
FIG. 16 is a plot which shows, as a function of the projection angle, the peak values of the projections of the magnitude squared auto-ambiguity function of the signal shown in FIG. 1A.

In actual implementation of the above detailed detection method, the choice of the projection angles, $\phi_{i_j}$, should be considered carefully. In some active sensor applications, due to hardware limitations, a fixed signal waveform is chosen for transmission. In these applications, the projection angles can be chosen in a preferred embodiment by computing the projections of the magnitude squared auto-ambiguity function of the time-scaled transmitted signal, $|A_s(\tau,v)|^2$, at various angles. Then, the decision on the projection angles can be based on a plot of the peak values of the individual projections as a function of the projection angle. To illustrate this approach, the signal waveform shown in FIG. 2A is chosen as an example. The corresponding plot of the peak values of the individual projections as a function of the projection angle is shown in FIG. 16. Then for this example, angles $\phi_1 = 32.7°$ and $\phi_2 = 147.3°$, where the largest peaks are located, can be determined on as the two projection angles to be used in the preferred structure of the processor 20 of the system of this invention.

Figure 17:
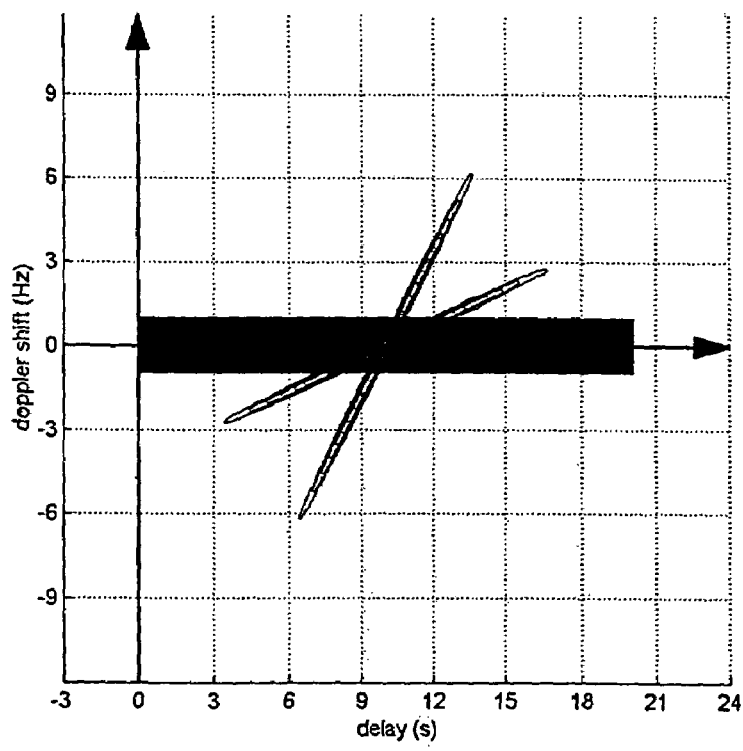
FIG. 17 is a contour plot, which shows an overlay of the cross-ambiguity functions for two alternative transmission signals $S_1(t)$ and $S_2(t)$ with band-limited uniform clutter at the receiver.
Figure 18A:
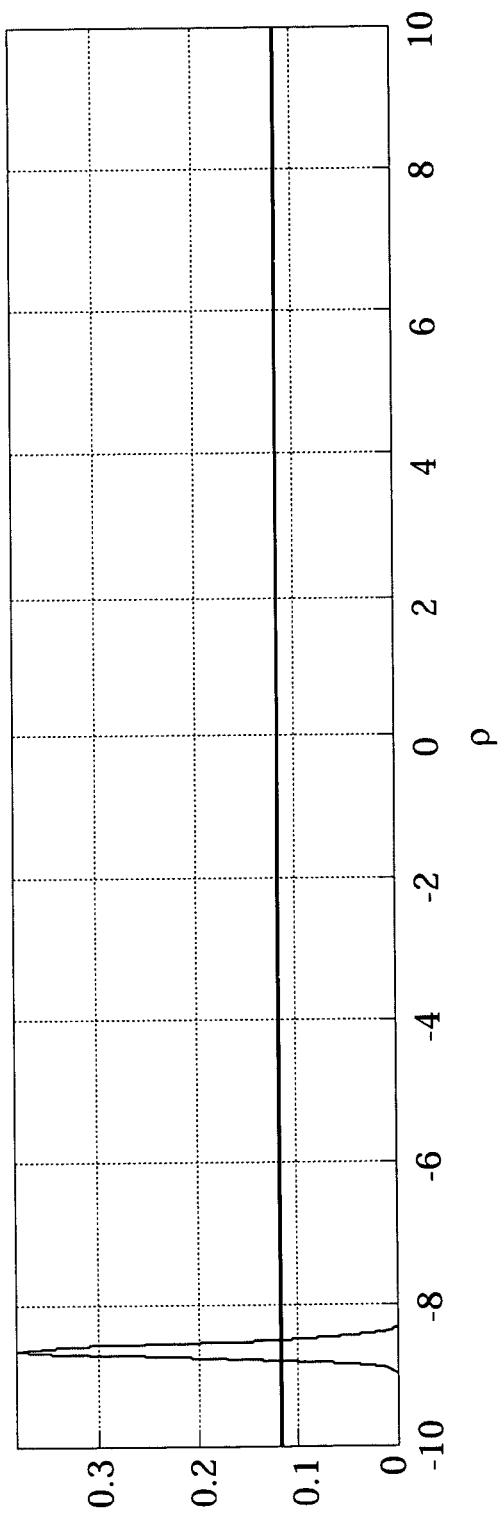
FIG. 18A shows the 60.0 degree projection of the magnitude squared cross-ambiguity function of the signal $S_1(t)$ and its corresponding received signal in clutter.
Figure 18B:
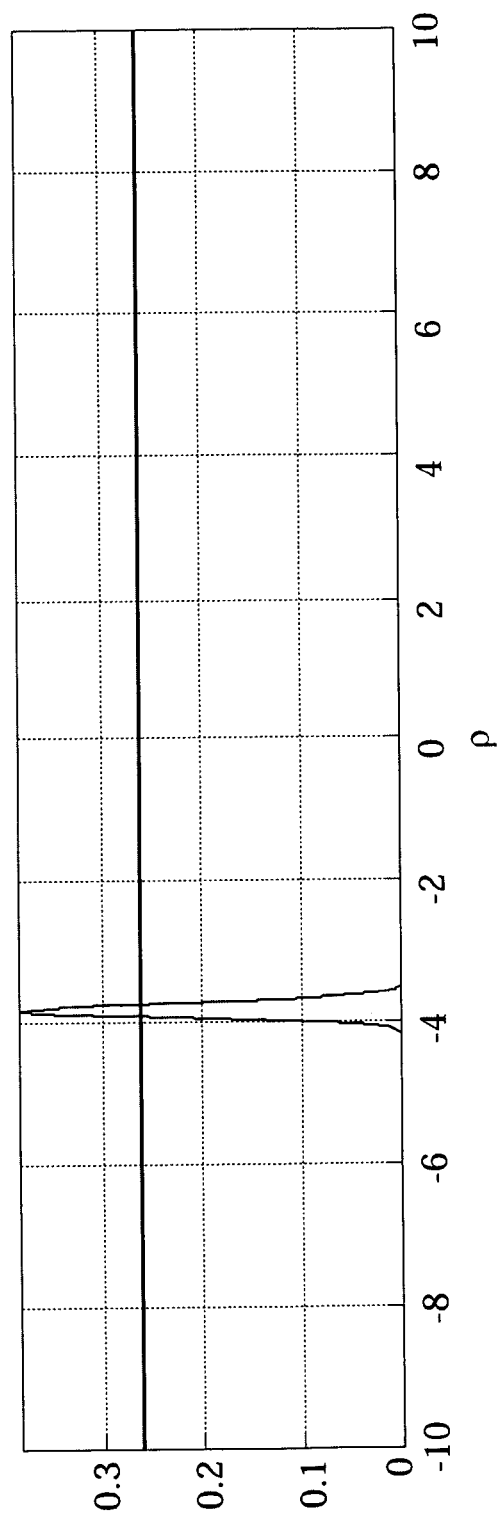
FIG. 18B shows the 45.0 degree projection of the magnitude squared cross-ambiguity function of the signal $S_2(t)$ and its corresponding received signal in clutter.

In some active sensor applications, the transmitted signal waveform can be designed to obtain an improved performance in a given operational environment. In the presence of a statistical description of the clutter and noise at the receiver, the transmitted signal can be designed so that its computed projections in the preferred structure of the first embodiment have more reliable detection performance. For instance, if the clutter has a uniform distribution in the shaded area shown in FIG. 17, then signal $s_1$ provides better detection performance than signal $s_2$. This is because the shown projection for $s_1$ in FIG. 18A has less clutter accumulation than the shown projection for $s_2$ in FIG. 18B. As seen from this example, the performance of the projection-based detection method can be improved considerably by a careful consideration of the operational environment in the signal design phase.

B. SECOND SYSTEM PROCESSOR

Figure 10:
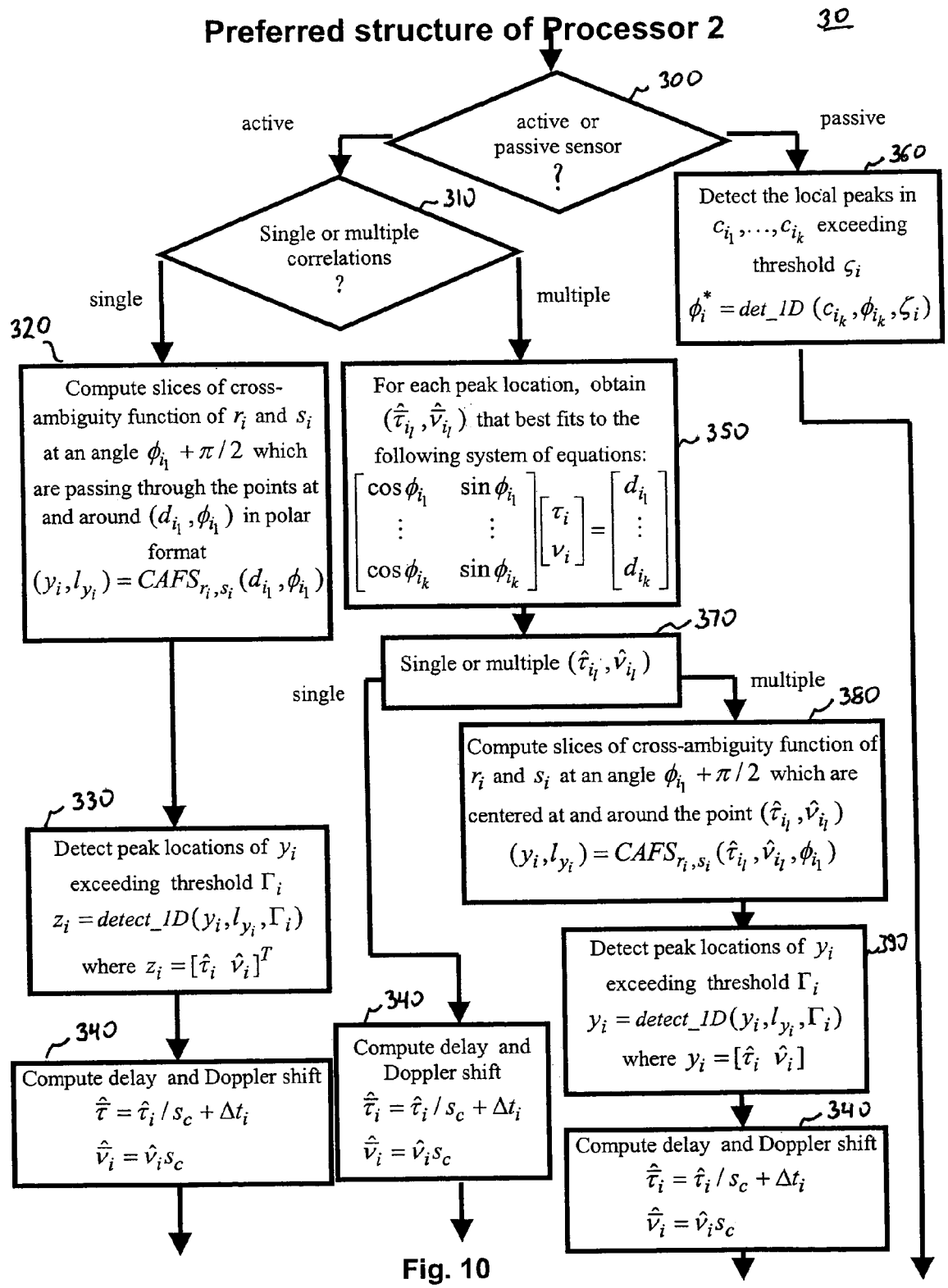
FIG. 10 is a block diagram illustrating the preferred configuration of another processor in accordance with a second embodiment of the invention.

FIGS. 5 and 10 illustrate in block diagram form the structure and operation of system processor 30 used in a preferred embodiment of the invention. Again, like processing blocks are labeled with like reference numerals. Focusing on FIG. 10, a block diagram illustrating the preferred configuration of the second processor is shown. This embodiment of the invention is also designed for both the active and passive sensor applications. In the case of active sensor applications, the second preferred embodiment provides estimates on the delays and Doppler shifts of the detected scattering objects. In the case of passive sensor applications, the second preferred embodiment provides estimates on the intercepted signal parameters. In the following description, details of the preferred embodiment are provided for both cases.

Figure 19:
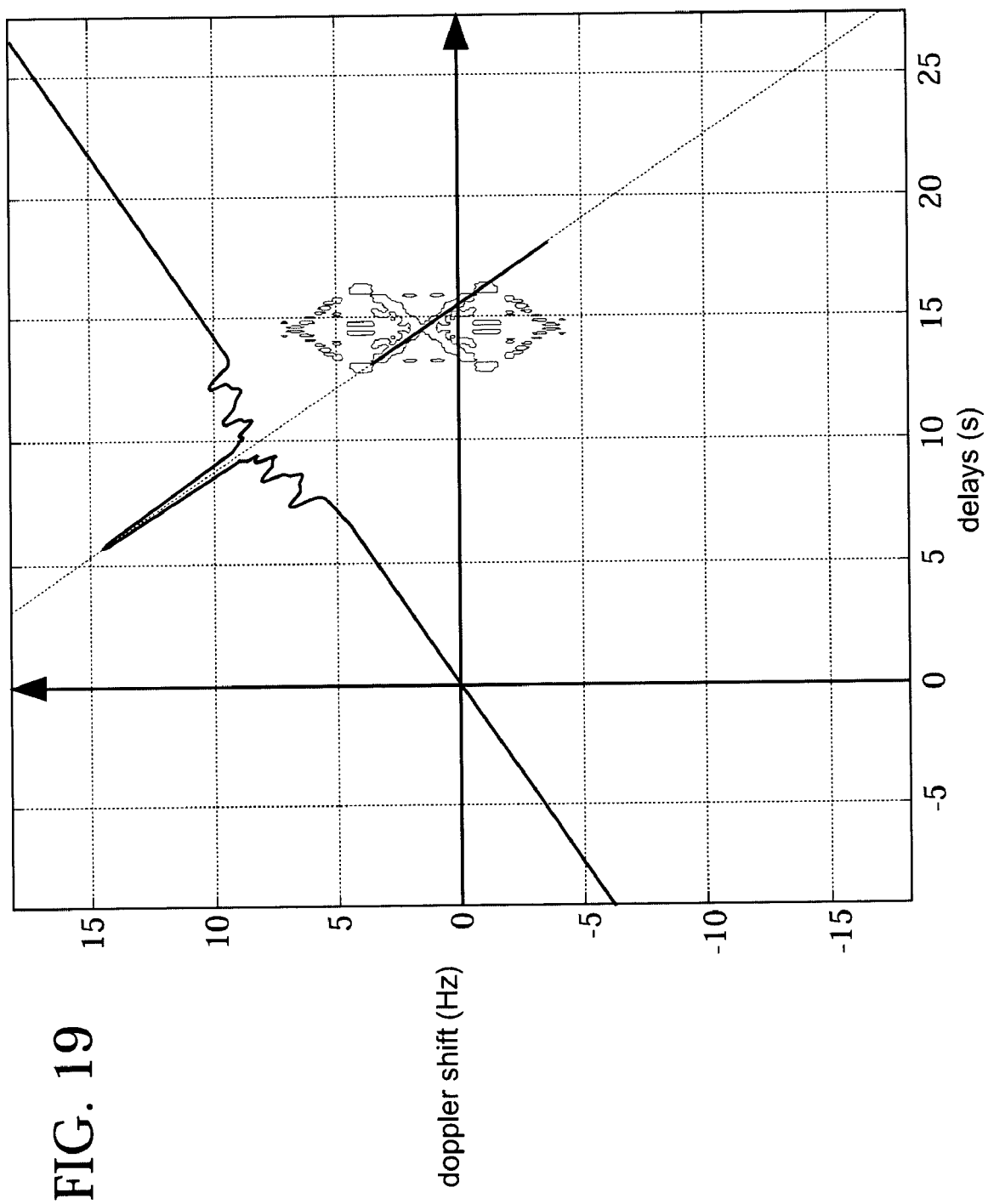
FIG. 19 is an illustration of the basic idea used in accordance with the present invention for the detection of the range and radial speed of a single scattering object by using only a single projection, where the indicated line segment corresponds to the potential locations of the cross-ambiguity function peak.
Figure 20A:
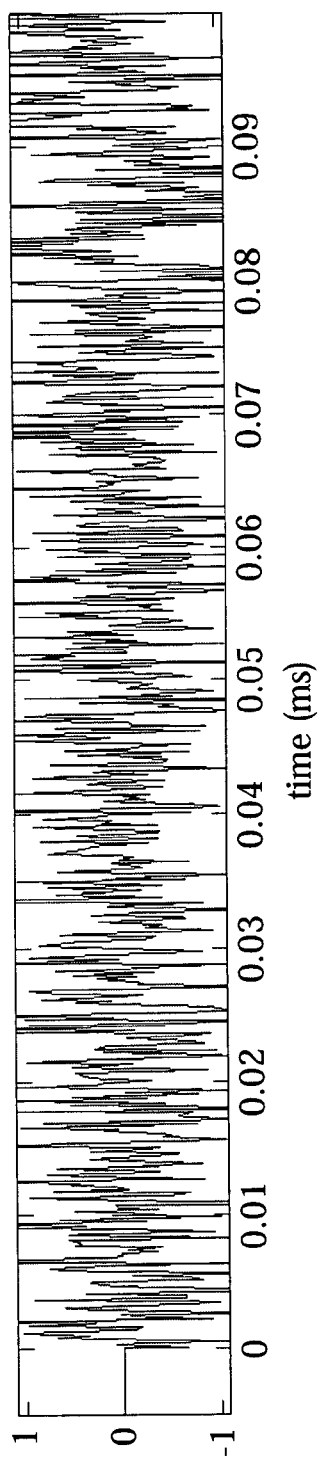
FIG. 20A shows the noisy received signal.
Figure 20B:
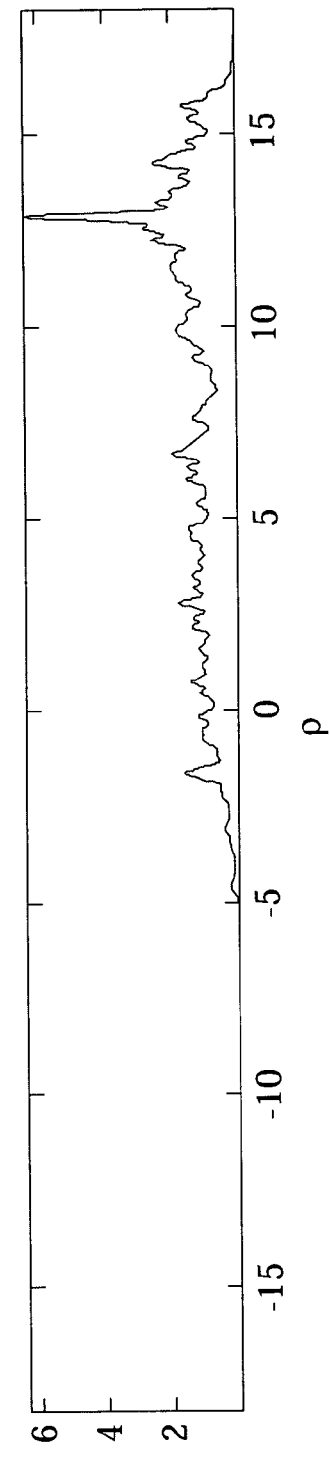
FIG. 20B shows the 50.0 degree projection of the magnitude squared cross-ambiguity function of the received and transmitted signals.
Figure 20C:
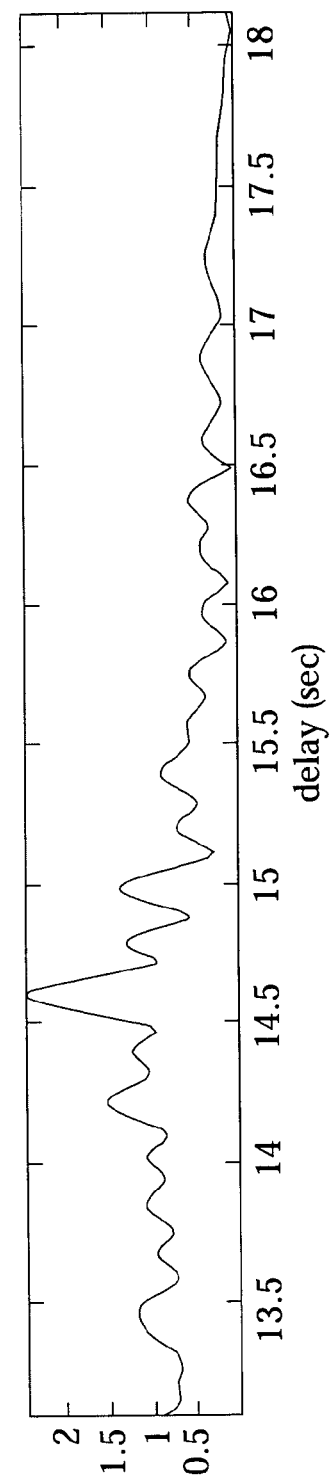
FIG. 20C shows the computed samples of the cross-ambiguity function on the line segment, that corresponds to the red colored line segment in FIG. 19.

As detailed in the previous section, in the preferred structure of the first processor to detect the presence of an object, single or multiple correlations can be computed. In the case of active sensor applications, the second processor is designed to estimate the delay and Doppler of the scattering objects. In the case of detection based on a single correlation computation in the first processor, the delay and Doppler estimates can be obtained by an implementation of the idea presented in FIG. 19 for the simple case of detection of only one scattering object. As detailed in the previous section, the computed correlation $c_{i_j}(\rho)$ is the projection of the magnitude squared cross-ambiguity function $|A_{r_i,s_i}(\tau,v)|^2$ at an angle $\phi_{i_j}$. Therefore, as shown in FIG. 19, the peak location of the cross-ambiguity function $A_{r_i,s_i}(\tau,v)$ is either on or very close to the line, which passes through the detected peak of the correlation at $d_{i_1}$ and perpendicular to the line of projection. Thus, by computing samples of the $A_{r_i,s_i}(\tau,v)$ on this line and detecting the location of the largest amplitude peak, a reliable estimate to the peak location of the cross-ambiguity function $A_{r_i,s_i}(\tau,v)$ can be obtained in accordance with the invention. This idea can be implemented efficiently by using the fast computational algorithms presented in [4], [5]. For completeness, the fast computational algorithm presented in [4] is given in Appendix B. In actual real time implementations, such a fast computational algorithm can be programmed in an integrated chip. To illustrate its performance, this method is simulated on the noisy received signal shown in FIG. 20A. Although there is significant noise in the received signal, the preferred structure of the first embodiment provides a projection at an angle of 32.7° with a distinct peak as shown in FIG. 20B. In FIG. 20C, the computed samples of the $A_{r_i,s_i}(\tau,v)$ are shown. As seen from the obtained samples, the peak location of the $A_{r_i,s_i}(\tau,v)$ can be identified easily. Once th peak location of the $A_{r_i,s_i}(\tau,v)$ is estimated, estimates for the delay and Doppler shifts of the detected object are obtained in a preferred embodiment as:

$$\hat{\tau}_i = \hat{\tau}_i/s_c + \Delta t_i( \quad (1.24)$$

$$\hat{v}_i = \hat{v}_i s_c, \quad (1.24)$$

where $s_c$ is the time-scaling constant defined in Eq. (1.5) and $\hat{\tau}_i$, $\hat{n}_i$ are the delay and Doppler shift estimates for the target object in the original uncaged coordinates. In this particular example, the actual and estimated delays are $$\bar{\tau}_i = 8.0 \times 10^{-5} \text{ s}$$

and $$\hat{\tau}_i = 7.99 \times 10^{-5} \text{ s},$$

respectively; and the actual and estimated Doppler shifts are $$\bar{v}_i = 2.67 \times 10^5 \text{ Hz}$$

and, $$\bar{v}_i = 2.60 \times 10^5 \text{ Hz}$$

respectively. As seen from this example, very accurate estimates for both the delay and Doppler can be obtained using the method of the present invention.

Figure 21:
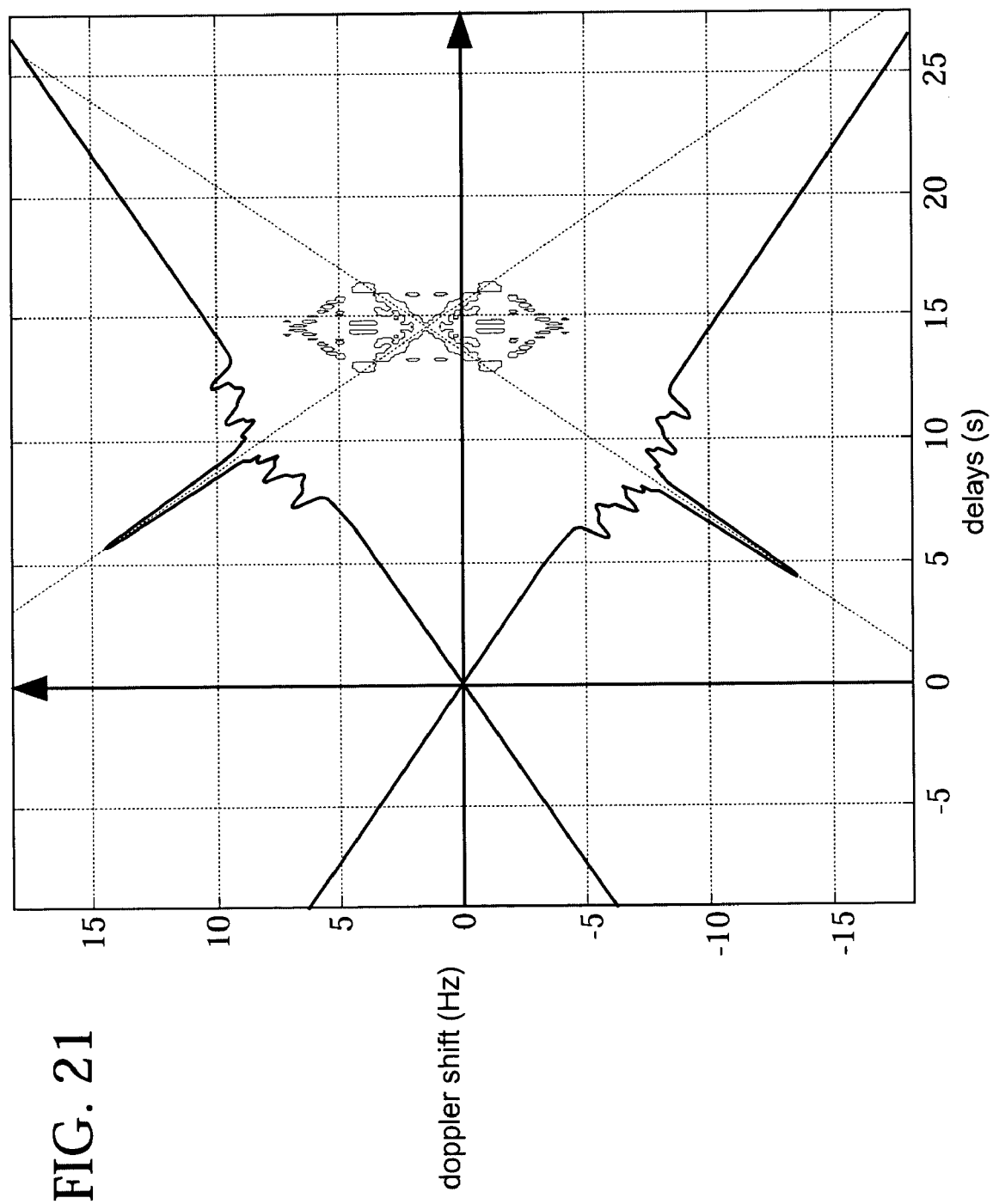
FIG. 21 is an illustration of the basic idea used in accordance with the present invention for the detection of the range and radial speed of a single scattering object by using two projections, where the intersection of the lines perpendicular to the projection lines and passing through the respective peak locations of the projections provide an estimate for the peak location of the cross-ambiguity function of the received and transmitted signals.

When more than one correlation are computed in the first processor, the delay and Doppler estimates can still be obtained by using the method presented for the single correlation case detailed above. This method can be implemented for the individual correlations yielding a set of detection results. Then, these detection results can be sorted to identify distinct scattering objects. The detection results corresponding to the same scattering object can be averaged to obtain more reliable estimates. In the case of multiple correlation computations in the first processor, another alternative method can be used, which is based on the idea shown in FIG. 21. For simplicity, in this figure the case of two correlation results corresponding to a single scattering object is shown. As seen from this figure, the lines, which are perpendicular to the projection lines and passing through the respective detected peak locations, either intersect or get very close at the peak location of the $A_{r_i,s_i}(\tau,v)$. Therefore, in the case of a single detection on individual correlations, the peak location of the $A_{r_i,s_i}(\tau,v)$ can be estimated by solving the following linear system of equations in the least squares sends [13]:

$$\begin{bmatrix} \cos\phi_{i_1} & \sin\phi_{i_1} \\ \vdots & \vdots \\ \cos\phi_{i_k} & \sin\phi_{i_k} \end{bmatrix} \begin{bmatrix} \tau_i \\ v_i \end{bmatrix} = \begin{bmatrix} d_{i_1} \\ \vdots \\ d_{i_k} \end{bmatrix} \quad (1.25)$$

$$N_i z_i = d_i.$$

The weighted least squares optimal solution to the above linear system of equations can be obtained as:

$$\hat{z}_i = \left[ (N_i^H W_i N_i)^{-1} N_i^H W_i \right] d_i \quad (1.26)$$
$$= M_i d_i,$$

where $W_i$ is a the positive definite weight matrix, and the $\hat{z}_i = [\hat{\tau}_i \, \hat{v}_i]^T$ corresponds to the estimated peak location of the $A_{r_i,s_i}(\tau,v)$. If the projection angles are kept constant during the data acquisition, the matrix $M_i$ in Eq. (1.26) can be computed in advance and stored in a digital memory to be retrieved when necessary. Once the peak location of the is $A_{r_i,s_i}(\tau,v)$ estimated, the actual delay and Doppler shifts of the detected object is estimated by using Eq. (1.24) given above.

Figure 22:
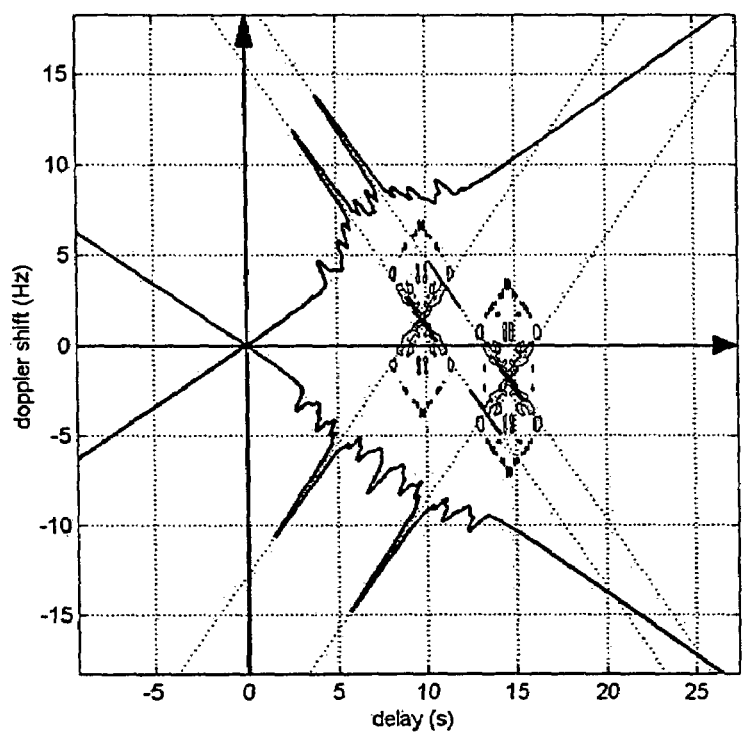
FIG. 22 is an illustration of the idea used in accordance with the present invention for the detection of the ranges and radial speeds of two scattering objects by using two projections; four line segments correspond to the potential locations of the cross-ambiguity function peaks, so by computing samples of the cross-ambiguity function on these line segments, close estimates of the actual peak locations can be found.
Figure 23:
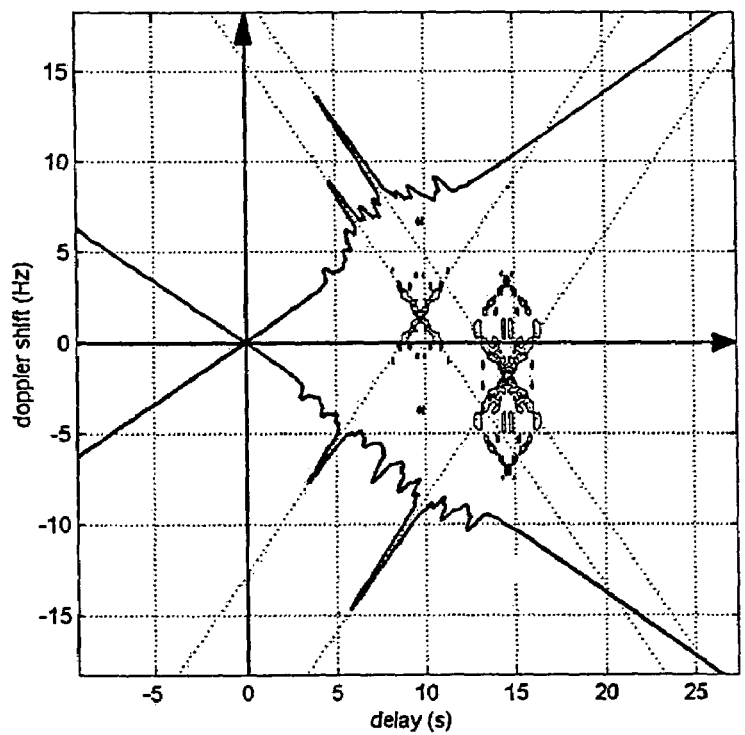
FIG. 23 is an illustration of the idea used in accordance with the present invention for the detection of the ranges and radial speeds of two scattering objects by using two projections where the detected peaks on the projections are significantly different in their amplitudes. As shown in this figure, the peak locations can be estimated as the marked intersection points.

In the case of multiple peaks detected on individual correlations, in accordance with the invention the corresponding peak locations of the $A_{r_i,s_i}(\tau,v)$ can be found in many alternative methods. To introduce some of these alternatives, a simple case of detection of two scattering objects on two different projections is shown in FIG. 22. The potential locations of the peaks in $A_{r_i,s_i}(\tau,v)$ are at the four intersections shown in FIG. 22. The decision in the actual locations can be based on computing values of $A_{r_i,s_i}(\tau,v)$ around these four intersection points by using the algorithm given in Appendix B. This method is shown as part of the preferred structure of the second embodiment in FIG. 10. If there is a significant difference between the magnitudes of the detected peaks on each correlation, in accordance with a second alternative method, the location of the peaks in $A_{r_i,s_i}(\tau,v)$ can be estimated as the intersection of those perpendicular lines which correspond to the similar magnitude peaks. The idea behind the method is illustrated in FIG. 23. Once the peak locations of the $A_{r_i,s_i}(\tau,v)$ are estimated, the actual delay and Doppler shifts of the detected objects are estimated by using Eq. (1.24) given above. In a third alternative, the potential peak locations of the $A_{r_i,s_i}(\tau,v)$ can be reduced to a set of a few potential peak locations by using the information on the previously detected and tracked objects. More detail on this alternative method is presented in the description of the third preferred embodiment of the invention.

In passive sensor applications, the embodiments of the second processor perform measurements on the intercepted signal and classify it based on the obtained results. Some of the intercepted signals have short duration, that are called pulse signals, while some of the intercepted signals have very long duration, that are called continuous signals. In the preferred structure of the second processor 30, measurements are performed on the intercepted signal to determine its time of arrival, amplitude and duration. Since these measurements can be performed by using well-known conventional methods, no further detail is presented here on these measurements. The interested reader is directed to the disclosure in [14], [15]. For intercepted pulse signals, the measurements of time of arrival, amplitude, duration and pulse repetition intervals can be used to classify an intercepted signal. However, the success of these type of classifiers is limited because these measurements alone do not provide sufficient information on the modulation of an intercepted signal. Furthermore, for intercepted continuous signals, since pulse duration and pulse repetition interval cannot be measured, the modulation information plays an even greater role in the classification of intercepted continuous signals.

Figure 24A:
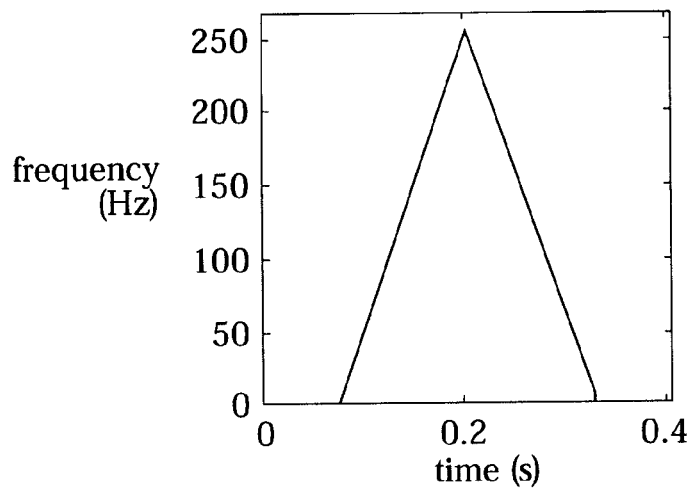
FIGS. 24A–C show three different pulse signals intercepted by a passive sensor system.
Figure 24B:
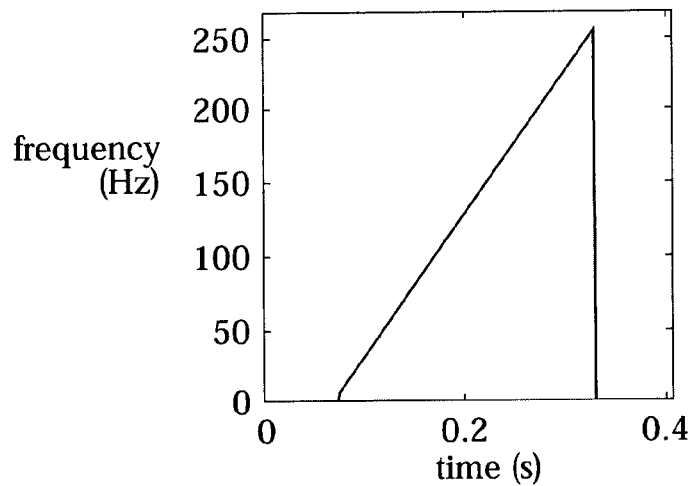
Figure 24C:
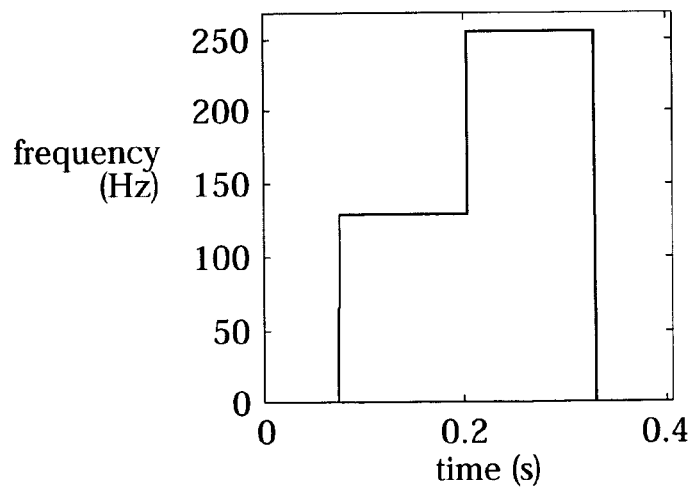
Figure 24D:
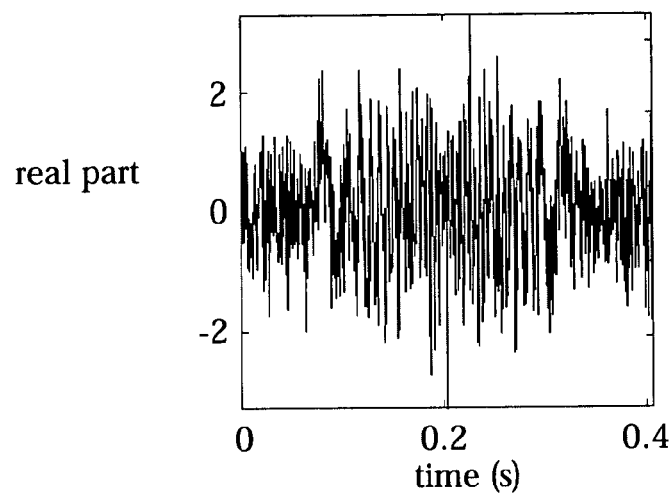
FIGS. 24D–F show the respective instantaneous frequency modulations on each pulse signal.
Figure 24E:
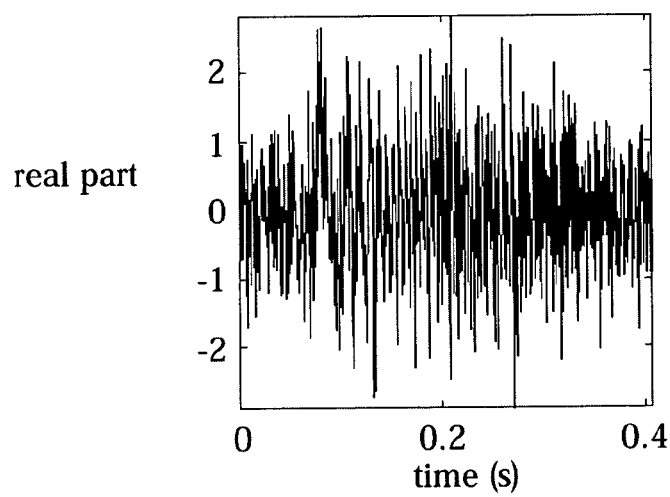
Figure 24F:
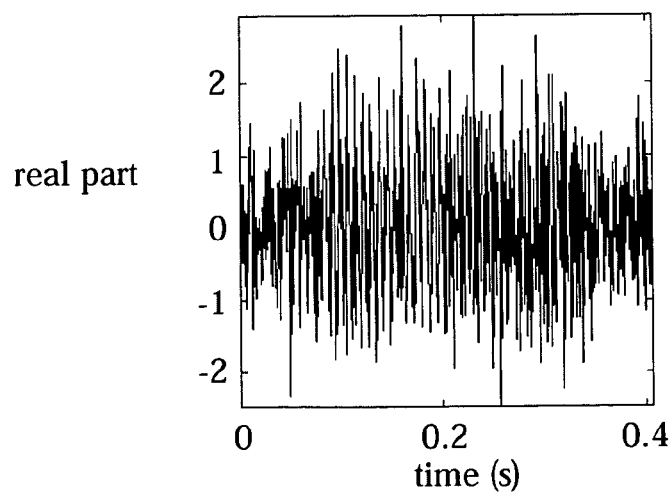
Figure 24G:
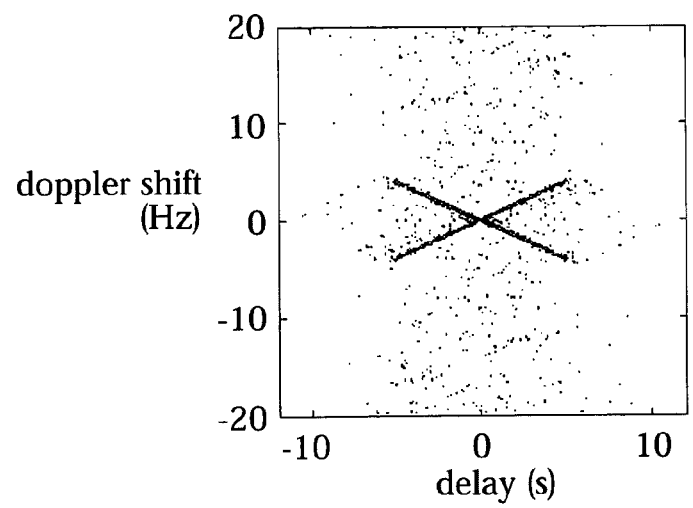
FIGS. 24G–I show the respective auto-ambiguity functions of the received signals.
Figure 24H:
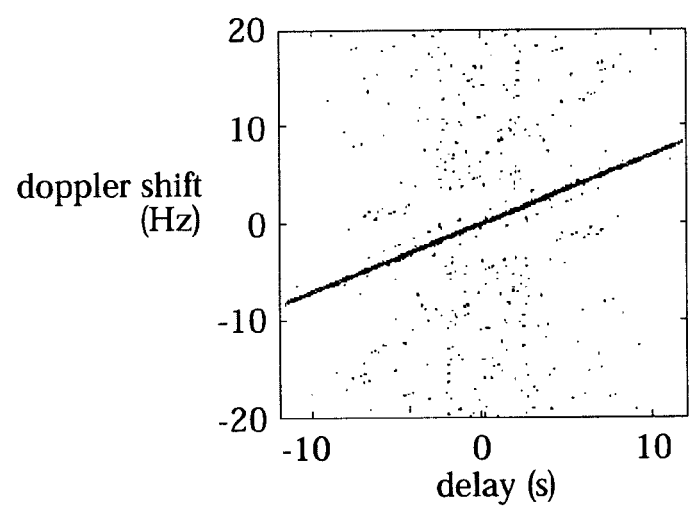
Figure 24I:
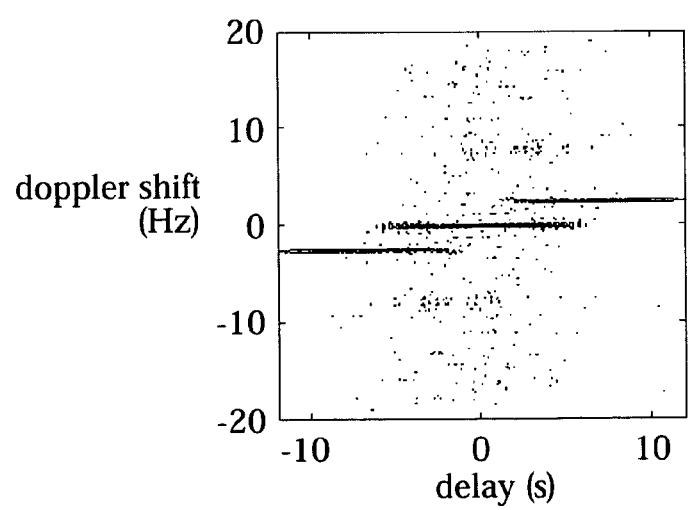
Figure 24J:
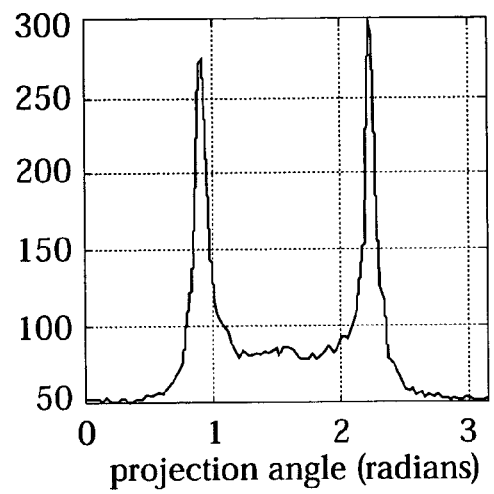
FIGS. 24J–L show the respective projection domain signatures of the received signals.
Figure 24K:
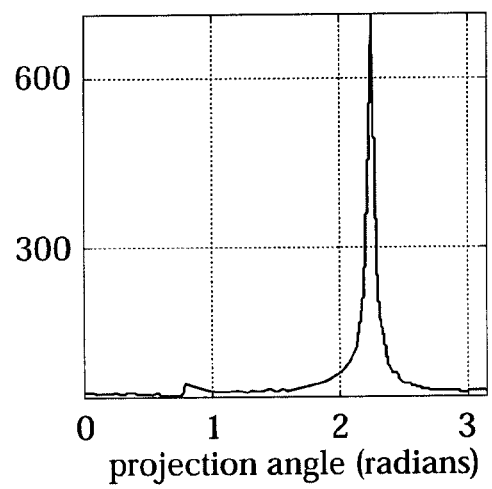
Figure 24L:
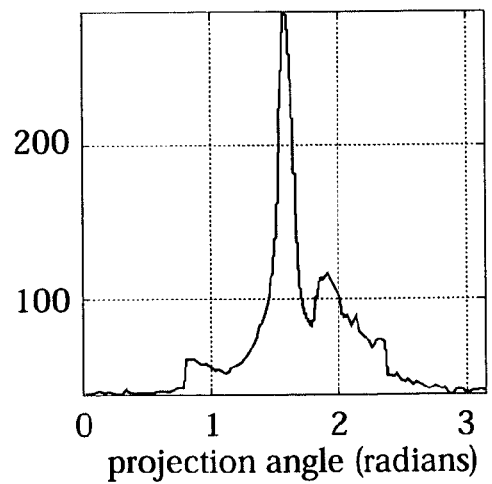

In this patent application, a new method is proposed to obtain important information on the modulation of an intercepted signal in real time. To illustrate the idea, examples on both pulse and continuous signals are investigated here. Detection results on three different pulse signals shown in FIGS. 24A–C are considered first. These three signals have identical values for their time of arrivals, amplitude and duration. Therefore, it is not possible to distinguish them from another based on these measurements alone. The computed auto-ambiguity functions of these three signals used in accordance with the present invention are shown in FIGS. 24G–I, respectively. As seen from these auto-ambiguity functions, these three signals have significantly different ambiguity domain characteristics. However, because of its computational complexity, classification based on auto-ambiguity domain characteristics is not practical. On the other hand, the projections of the magnitude squared auto-ambiguity function, which is computed efficiently by using Eqns. (1.22) or (1.23), provides projection domain signatures of these signals, which are shown in FIGS. 24J–L, respectively. Since the computed projection domain signatures significantly differ from each other, these three pulse signals can be distinguished easily based on their projection domain signatures.

Figure 25A:
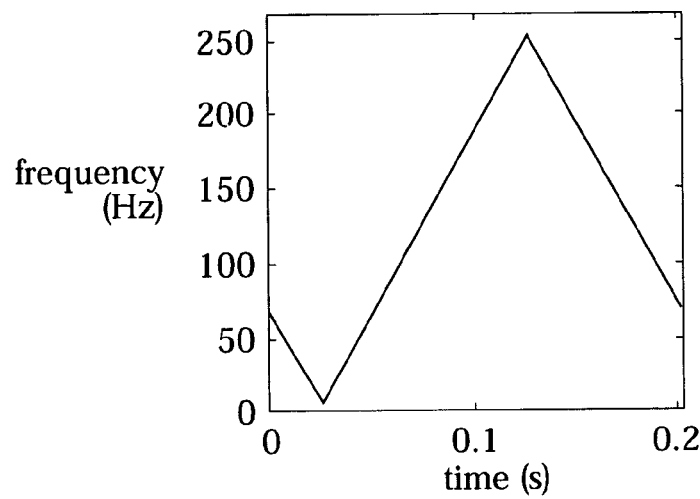
FIGS. 25A–C show three different continuous signals intercepted by a passive sensor system.
Figure 25B:
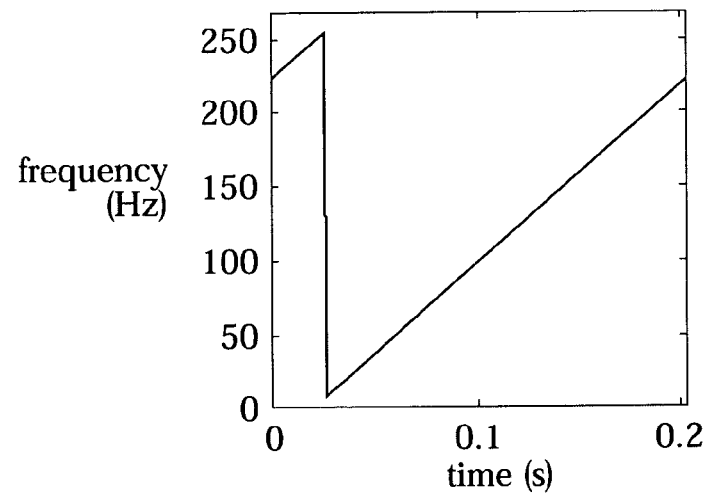
Figure 25C:
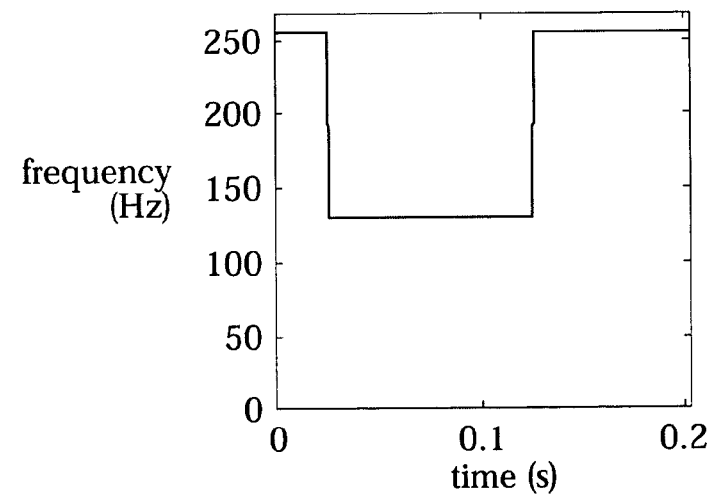
Figure 25D:
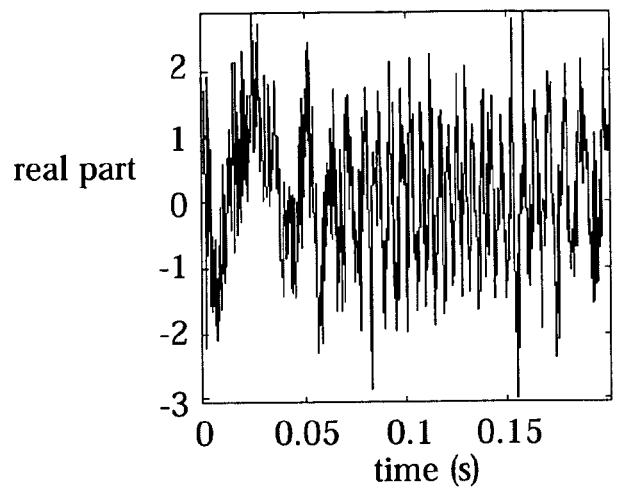
FIGS. 25D–F shows the respective instantaneous frequency modulations on each signal.
Figure 25E:
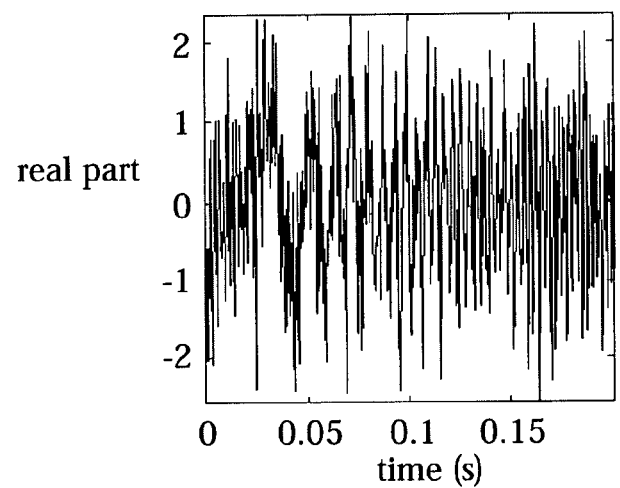
Figure 25F:
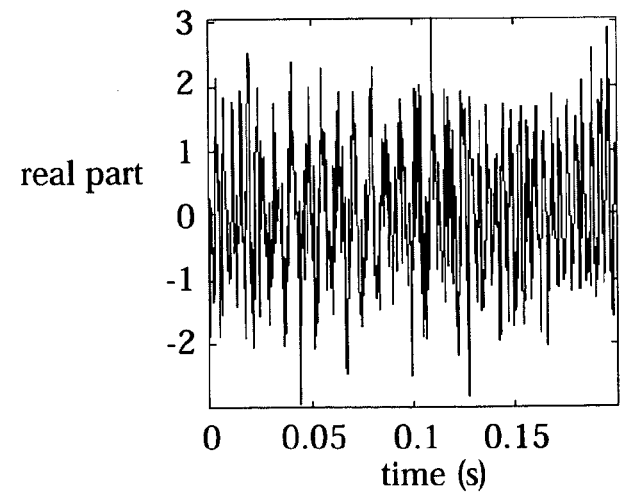
Figure 25G:
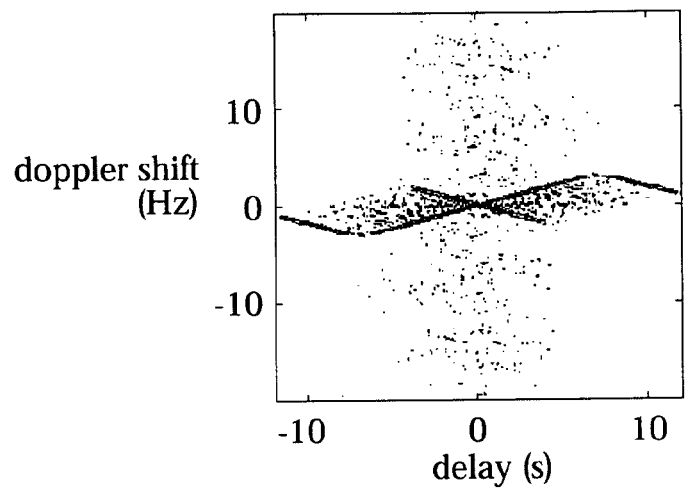
FIGS. 25G–I illustrate the respective auto-ambiguity functions of the received signals.
Figure 25H:
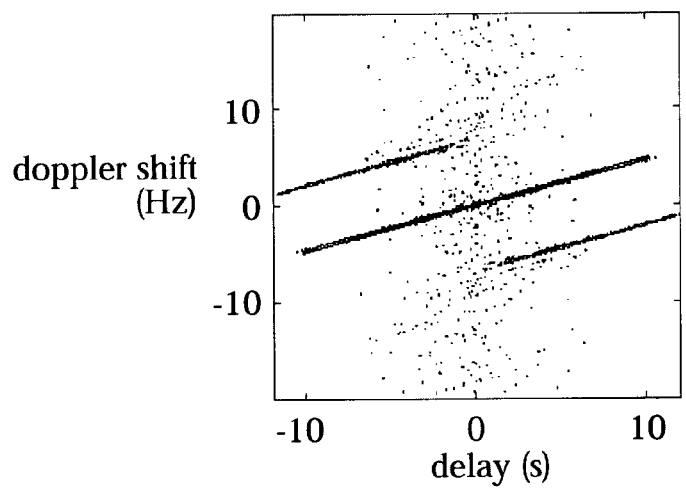
Figure 25I:
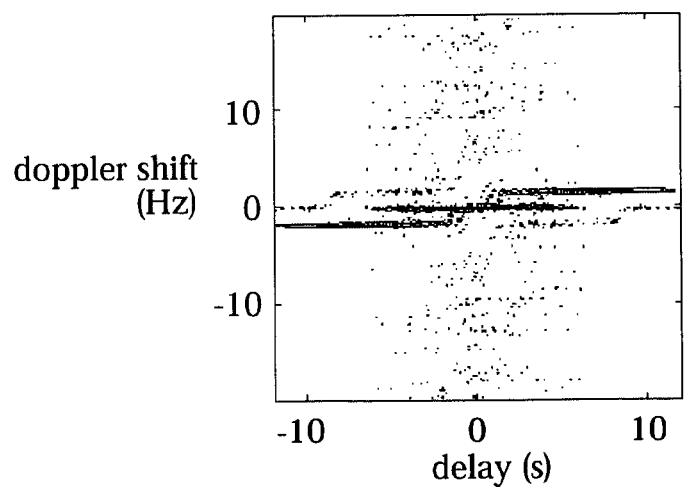
Figure 25J:
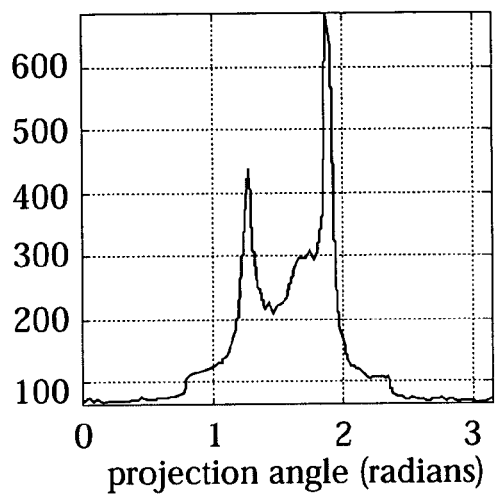
FIGS. 25J–L show the respective projection domain signatures of the received signals.
Figure 25K:
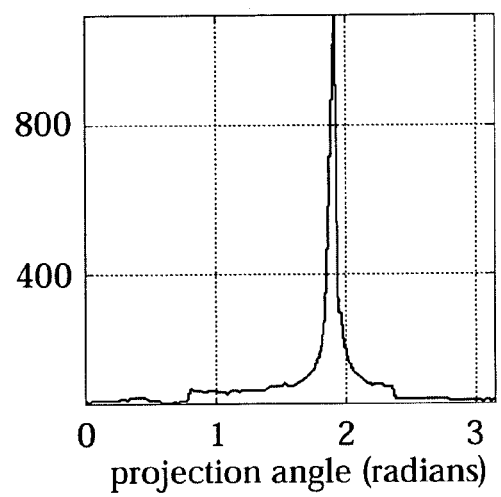
Figure 25L:
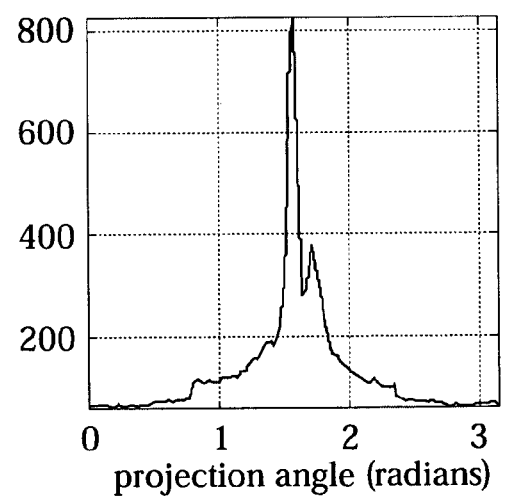

Similar conclusions can be drawn from the examination of the three different continuous signals shown in FIGS. 25A–C. These three signals have identical values for their amplitude and center frequency of their modulation. Therefore, it is not possible to distinguish them from one another based on these measurements alone. The computed auto-ambiguity functions of these three signals are shown in FIGS. 25G–I, respectively. In this computation the same length frames are used for each signal, and the frame length is chosen as approximately the period of modulation. For more noisy received signals, the frame length can be chosen larger for better detection and classification performance. As seen from these auto-ambiguity functions, these three signals have significantly different ambiguity domain characteristics. However, because of its computational complexity, classification based on auto-ambiguity domain characteristics is not practical. On the other hand, the projections of the magnitude squared auto-ambiguity function, which are computed efficiently by using Eqns. (1.22) or (1.23), provides projection domain signatures of these signals shown in FIGS. 25J–L, respectively. Since the compound projection domain signatures differ significantly from each other, these three continuous signals can be distinguished easily based on their projection domain signatures.

In the preferred structure of the second processor, this classification method is implemented as follows. In advance of the actual operation, the projection domain signatures of the signals that may be intercepted in the operational environment, and are computed over a dense sampling grid. Based on a detailed study of these signatures, a few samples out of each signature are chosen as the critical set of samples. For each signature, most of these critical samples can be chosen around the peak locations of the respective signature. Then, the obtained critical samples are stored in a digital memory to be retrieved when necessary. This reduction is the number of samples in each signal signature to a few critical ones, provides significant saving in the computation of the required projections. During the actual operation, the projections corresponding to the critical samples are computed by using the fast computational algorithm presented in the detailed description of the first processor. Next, the obtained projections are compared with a set of stored signal signatures to find a matching one. If there is a match, the matching signal type is reported to the third processor of the system of the invention, which keeps track of the active transmitters. If no match is found, the signature of the intercepted signal is transferred to the tracker 40 to be stored for future analysis.

C. THE SYSTEM TRACKER

Figure 11:
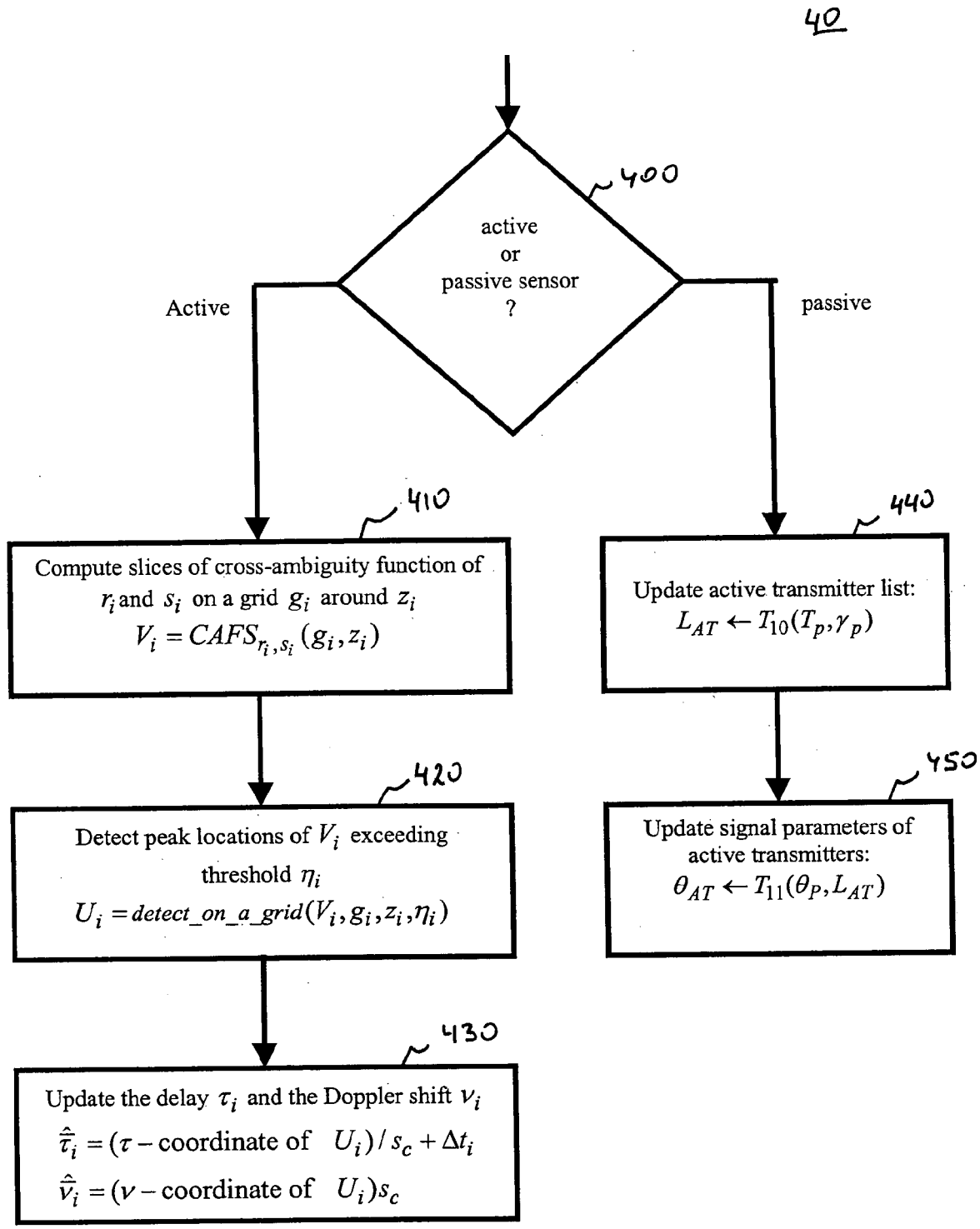
FIG. 11 is a block diagram illustrating the preferred configuration of a tracker subsystem in accordance with a preferred embodiment of the invention.

FIG. 11 is a block diagram illustrating the preferred configuration of a tracker 40 used in accordance with the present invention. The tracker is also designed for both the active and passive sensor applications. In active sensor applications, the tracker keeps a list of the detected objects, where the delay and Doppler shift caused by individual objects are recorded. In addition to the delay and Doppler shift information, when they are available, the motion direction of the objects should also be recorded. If an object in the list could not be detected by the active sensor system in the most recent searches, it is removed from the active list of objects. For each of the objects in the active list, the tracker analyzes the available information on the object and provides estimates for its future delay, Doppler shift and direction. Kalman filtering is a well-known technique that can be used to provide these estimates [17], [18]. These estimates are used to shorten the processing time in the first and second processor of the invention as detailed below.

The tracker reports the obtained estimates of the delay and Doppler shift caused by individual scattering objects as well as their directions to both the first and second processor used in the system of the invention. In the first processor this information is used in the construction of the received signal frames. In the preferred way, short frames are constructed around the expected delays of the scattering objects whose estimated directions are very close to the current search direction of the sensor system. In this way, the likelihood of having reflections from multiple objects in a received signal frame is kept low. Furthermore, for those signal frames that are around the expected delays of the tracked objects, the detection thresholds used in the first embodiment can be adjusted for reliable detection of the tracked objects. In other signal frames, which do not contain expected reflections of the tracked objects, the search for new scattering objects are conducted as detailed in the above sections.

Figure 26:
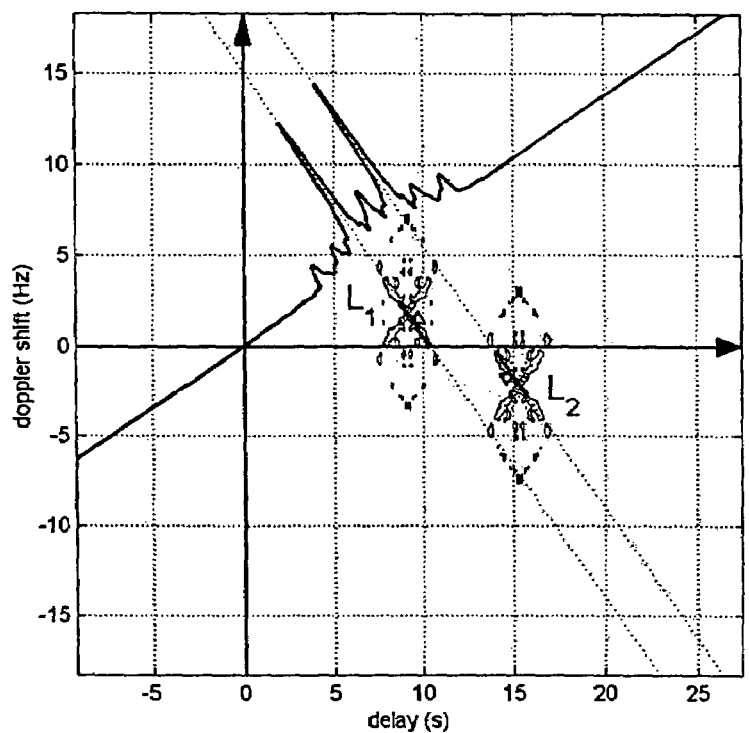
FIG. 26 is an illustration of how the tracking information on the previously detected objects can be used in obtaining the peak locations of the cross-ambiguity function. The figure shows the detection of the ranges and radial speeds of two scattering objects by using a single projection. The tracking information enables the search for the peaks of the cross-ambiguity function to be conducted over short line segments.

In the second processor, the information reported by the tracker is used to estimate the delays and Doppler shifts corresponding to the tracked objects. The available estimates of the tracker can be utilized in all the alternative estimation methods presented in the detailed description of the second processor. In the case of a single correlation computation in the first embodiment, the search for the cross-ambiguity function peaks can be conducted over short line segments whose centers are close to the reported delay and Doppler shifts of the tracked objects. This idea is illustrated in FIG. 26.

Figure 27:
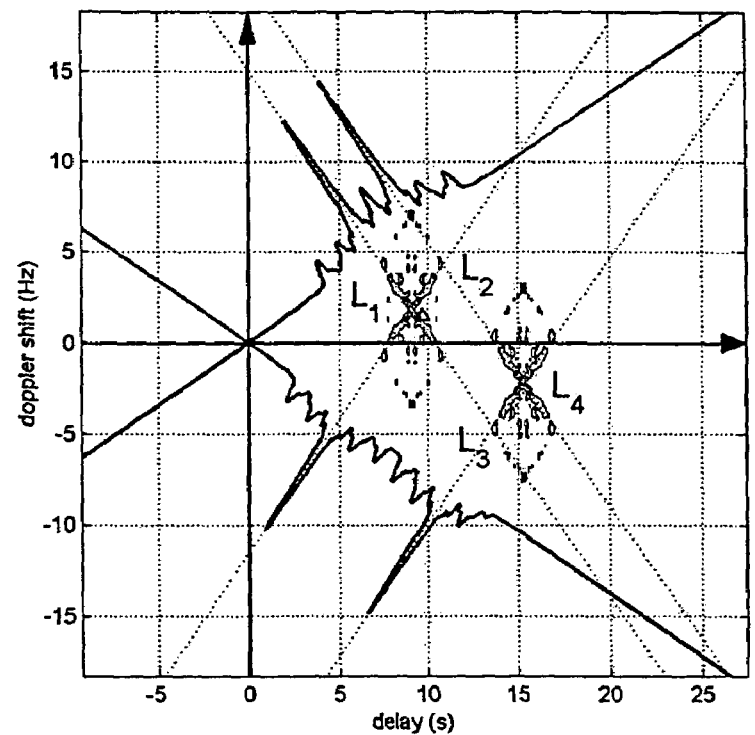
FIG. 27 is an illustration of how the tracking information on the previously detected objects can be used in obtaining the peak locations of the cross-ambiguity function. In the illustration, the detection of the ranges and radial speeds of two scattering objects by using two projections is shown. As illustrated, the tracking information enables the identification of the new position of the tracked object. This identification eliminates $L_2$ and $L_3$, and identifies $L_4$ as the peak location, corresponding to a newly detected object.

FIG. 27. Since shorter line segments are used, less computation is required in the digital computation of cross-ambiguity function slices by using the algorithm given in Appendix B. In the case of multiple scattering objects detected on multiple correlations, the potential locations of the peaks in $A_{r_j,s_i}(\tau,v)$ can be reduced by using the reported tracked objects. To illustrate how the available information on the tracked objects can be used to reduce the number of potential peak locations, an example case is shown in FIG. 27. As shown in this figure, there are four possible peak locations for the detected objects. The reported delay and Doppler shift estimates of the tracked object shown in this figure can be used to identify actual peak locations as follows. Among the four possible peak locations the closest one $L_1$ to the reported peak location is identified as an actual peak location. This identification eliminates the two other possible peak locations (sown as $L_2$ and $L_3$ in the figure) and identifies the fourth one (shown as $L_4$ in the figure) as the peak location, corresponding to a newly detected object.

In passive sensor applications, the tracker keeps a list of the intercepted transmitters and their measured parameters by the second processor. These parameters include the computed projection domain signature, time of arrival, amplitude and duration of the intercepted signal, as well as the direction of the intercepted signal and the operation frequency interval of the receiver system. According to the current search direction and frequency interval, the tracker reports the appropriate subset of active transmitters in this list to both the first and second processors of the invention. Furthermore, the tracker controls the operations performed in the first and second processor for efficient use of the available resources. In the preferred structure of the first processor, a set of projections given in Eq. (1.22) or Eq. (1.23) is computed at the projection angles dictated by the tracker. The obtained projections are reported to the second processor. In the preferred structure of the second processor, further measurements are performed on the intercepted signal to determine its time of arrival, amplitude and duration. Based on the obtained information on the intercepted signal, a comparison of the intercepted signal is made with the set of signals chosen by the tracker. If there is a match found, the matching signal type is reported to the third processor (the tracker) of the invention, which keeps track of the active transmitters. If there is no match found, the signature of the intercepted signal is compared with a larger set of previously stored signal signatures. If there is a match found in this second round of search, the matching signal is reported to the tracker to be added to the active list of transmitters. However, if there is no match found even in the second round of search, the intercepted signal is transferred to the tracker to be stored for future analysis.

The foregoing description of the preferred embodiments of the present invention has been presented for purposes of illustration and description. It is not intended to be exhaustive nor to limit the invention to the precise form disclosed. Many modifications and variations will be apparent to those skilled in the art. The embodiments were chosen and described in order to best explain the principles of the invention and its practical applications, thereby enabling others skilled in the art to understand the invention. Various embodiments and modifications that are suited to a particular use are contemplated. It is intended that the scope of the invention be defined by the accompanying claims and their equivalents.

APPENDIX A

Object of the Algorithm

Given samples $r[n] \underline{\Delta} r(n/(2\Delta_r))$, $-N \leq n \leq N-1$, of the analog signal $r(t)$ obtained at twice the Nyquist's rate, to compute the discrete fractional Fourier transform $r_\alpha[m]$, $-N \leq m \leq N-1$. It is assumed that $N \geq \Delta_r^2$, where $\Delta_r$ is the square root of the approximate time duration (T) and band width (B) product BT of the signal $\bar{r}(t)$.

Steps of the Algorithm $\alpha' := (\alpha + 2 \bmod 4) - 2$

% After the modulo operation, $\alpha' \in [-2, 2)$
% The cases of $\alpha' \in [0.5, 1.5]$ and $\alpha' \in \{[-2, -0.5) \cup (-0.5, 2)\}$ have to be treated separately.
if $|\alpha'| \in [0.5, 1.5]$ then
$\alpha'' := \alpha'$
else $\alpha'' := (\alpha' + 1 \bmod 4) - 2$ % After the modulo operation, $\alpha'' \in (0.5, 1.5)$
end if $$\phi'' := \frac{\pi}{2} \alpha''$$

$$\alpha'' := \cot \phi''$$

$$\beta'' := \csc \phi''$$

$$A_{\phi''} := \frac{\exp(-j\pi \operatorname{sgn}(\sin \phi'')/4 + j\phi''/2)}{|\sin \phi''|^{1/2}}$$

% Compute the following sequences:

$c_1[m] := e^{j\pi \frac{1}{4}(\alpha''/\Delta_r^2 - \beta''/N)m^2}$    for $-N \leq m \leq N-1$ $c_2[m] := e^{j\pi \beta''(m/2\sqrt{N})^2}$    for $-2N \leq m \leq 2N-1$ -continued $c_3[m] := e^{j\pi \frac{\Delta_r^2}{4N}(\alpha''/N - \beta''/\Delta_r^2)m^2}$    for $-N \leq m \leq N-1$ $g[m] := c_1[m] r[m]$    for $-N \leq m \leq N-1$ % In the last step FFT is used to compute the convolution in $O(N \log N)$ flops.
if $|\alpha| \in [0.5, 1.5]$ then
$r_\alpha(m/2\Delta_r) := r_{\alpha'}(m/2\Delta_r)$
else
% Compute samples of the ordinary FT using FFT.

$r_\alpha(m/2\Delta_r) := \{F^1 r_{\alpha'}\}(m/2\Delta_r)$ end if

APPENDIX B

Object of the Algorithm

Figure 28:
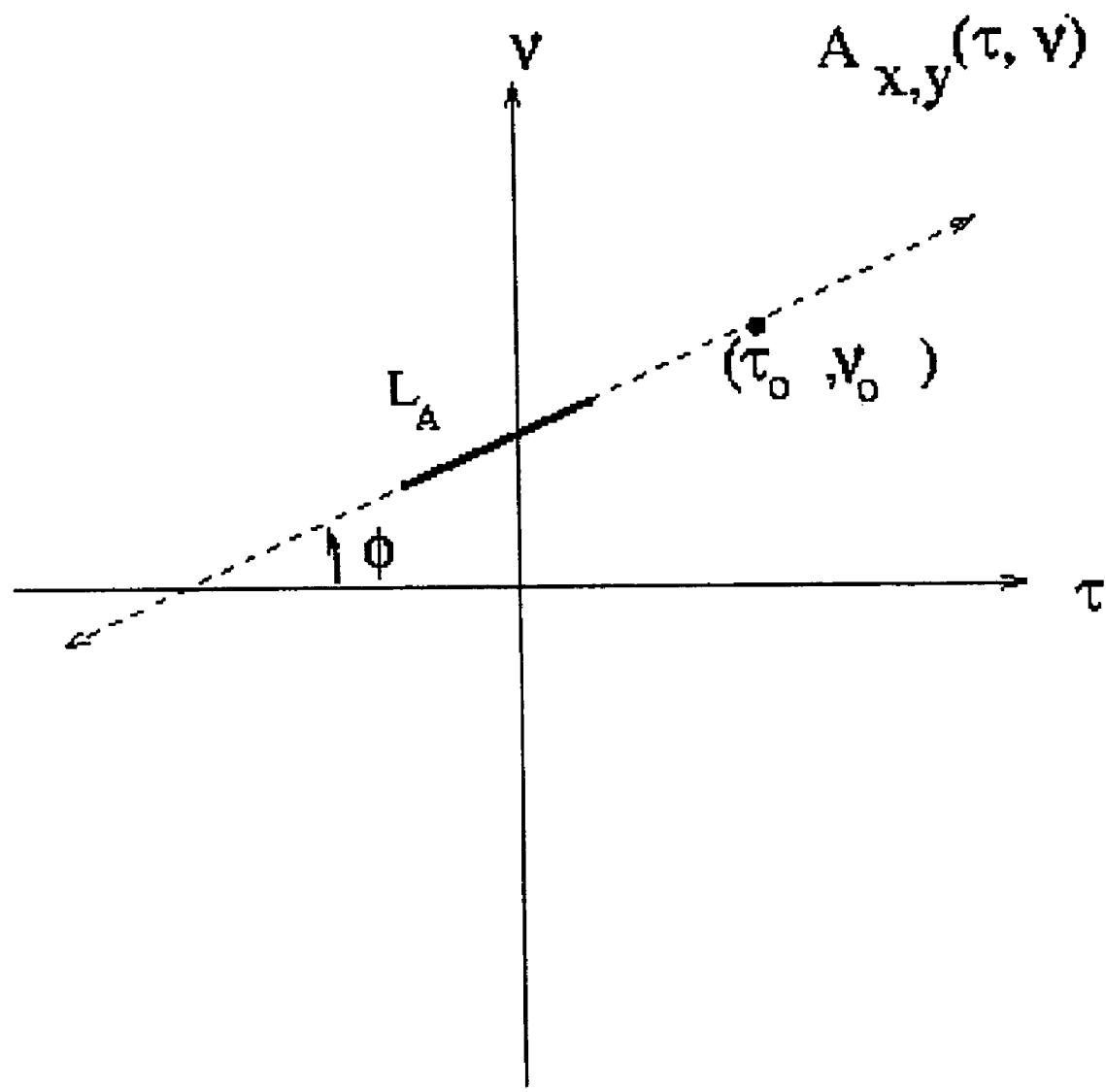
FIG. 28 is a drawing illustrating an arbitrary line segment $L_A$ on which samples of the cross-ambiguity function can be computed efficiently using a computational algorithm in a preferred embodiment of the present invention.

Given samples $r[n] \underline{\Delta} r(n/(2\Delta_r))$ and $s[n] \underline{\Delta} s(n/(2\Delta_r))$, $-N \leq n \leq N-1$, of the analog signals $r(t)$ and $s(t)$ obtained at twice the Nyquist's rate, to approximate N' samples of the cross ambiguity function of $r(t)$ and $s(t)$ along the line segment $L_A$ as shown in FIG. 28.

Steps of the Algorithm

If a radical slice then $r_{\alpha+1}[n] := \{F^{\alpha+1} r\}(n/(2\Delta_r))$ for $-N \leq n \leq N-1$ discrete fractional Fourier transform $s_{\alpha+1}[n] := \{F^{\alpha+1} s\}(n/(2\Delta_r))$ for $-N \leq n \leq N-1$ discrete fractional Fourier transform $p_{\alpha+1}[n] := r_{\alpha+1}[n] s^*_{\alpha+1}[n]$ for $-N \leq n \leq N-1$
else $\tilde{r}[n] := r(n/\Delta_r + \tau_0/2) e^{-j\pi v_0 n/\Delta_r}$ for $-N/2 \leq n \leq N/2 - 1$ $\tilde{s}[n] := s(n/\Delta_r - \tau_0/2) e^{j\pi v_0 n/\Delta_r}$ for $-N/2 \leq n \leq N/2 - 1$ $\tilde{r}_{\alpha+1}[n] := \{F^{\alpha+1} \tilde{r}\}(n/(2\Delta_r))$ for $-N \leq n \leq N-1$ discrete fractional Fourier transform $\tilde{s}_{\alpha+1}[n] := \{F^{\alpha+1} \tilde{s}\}(n/(2\Delta_r))$ for $-N \leq n \leq N-1$ discrete fractional Fourier transform $p_{\alpha+1}[n] := \tilde{r}_{\alpha+1}[n] \tilde{s}^*_{\alpha+1}[n]$ for $-N \leq n \leq N-1$
end if $$A_{rs}(\tau_k, v_k) := \frac{1}{2\Delta_r} \sum_{n=-N}^{N-1} p_{\alpha+1}[n] e^{j\frac{\pi}{\Delta_r} \lambda_k n} \text{ for } 0 \leq k \leq N'-1$$

by using chirp-z transform algorithm where $(\tau_k, v_k) \triangleq (\tau_0 + \lambda_k \cos \phi, v_0 + \lambda_k \sin \phi)$ and $$\lambda_k \triangleq \lambda_i + k \frac{\lambda_f - \lambda_i}{N' - 1}.$$

What is claimed is:

1. A signal processing system comprising:
    a signal receiver;
    a first processor operable to compute one or more projections of the magnitude squared auto-ambiguity function of a received modulated signal; and
    a second processor operable to determine a modulation type of the received signal based on the computed one or more projections.

2. The system of claim 1 further comprising a memory for storing one or more previously computed signatures of projections of the magnitude squared auto-ambiguity function of one or more know signals, and the second processor is further operable to determine the modulation type of the received signal by computing signatures of the one or more projections of the received signal, and comparing the signatures of the projections of the received signal to the previously computed signatures of the known signals.

3. The system of claim 1, wherein the signal receiver is capable of receiving one or both of: continuous waveform signals and discrete-time signals.

4. A computer program product comprising:
    a medium with instructions stored thereon that cause a computer system to
    (a) receive a signal;
    (b) compute one or more projections of the magnitude squared auto-ambiguity function of the received signals; and
    (c) determine a modulation type of the received signal based on the computed projections.

5. The computer program product of claim 4, having the medium further stored thereon instructions that cause the computer system to compute projection signatures in the magnitude squared ambiguity function domain of at least one known signal.

6. The computer program product of claim 5 having the medium further stored thereon instructions that cause the computer system to store said projection signatures.

7. The computer program product of claim 6, wherein instructions that causes the computer system to determine the modulation type of the received signal, comprise instructions that cause the computer system:
    (i) compute signatures of the one or more projections of the received signal; and
    (ii) compare the stored projection signatures to the computed signatures of the one or more projections of the received signals.

8. The computer program product of claim 4, having the medium further stored thereon instructions that cause the computer system to determine one or more properties of the received signal in addition to its modulation type.

9. The computer program product of claim 8, wherein the determined properties include one or more of a time of arrival of the received signal, an amplitude of the received signal, and a duration of the received signal.

10. The computer program product of claim 9, having the medium further stored thereon instructions that cause the computer system to characterize a source of the received signal based on the determined modulating type.

11. A signal processing method comprising the steps of:
    receiving a modulated signal;
    computing one or more projections of the magnitude squared auto-ambiguity function of the received signal; and
    determining a modulation type of the received signal based on the one or more computed projections.

12. The method of claim 11 further comprising the step of selecting a projection of the magnitude squared auto-ambiguity function from the one or more projections of the magnitude squared auto-ambiguity function, wherein the projection is selected on the basis of peaks of the magnitude squared auto-ambiguity function.

13. The method of claim 11, wherein the receive signal is a continuous waveform signal.

14. The method of claim 11, wherein the received signal is a discrete-time signal.

15. The method of claim 11 further comprising the step of computing projection signatures in the magnitude squared ambiguity function domain of at least one known signal.

16. The method of claim 15 further comprising the step of storing said projection signatures.

17. The method of claim 16, wherein the step of determining the modulation type of the received signal comprises:
    computing signatures of the one or more projections of the received signal; and
    comparing the stored projection signatures to the computed signatures of the one or more projections of the received signals.

18. The method of claim 11 further comprising the step of determining one or more properties of the received signal in addition to its modulation type.

19. The method of claim 18, wherein the determined properties include one or more of: a time of arrival of the received signal, an amplitude of the received signal, and a duration of the received signal.

20. The method of claim 11 further comprising the step of characterizing a source of the received signal based on the determined modulation type.

* * * * *